US012795260B2

(12) United States Patent
Jang et al.

(10) Patent No.: US 12,795,260 B2
(45) Date of Patent: Nov. 10, 2026

(54) IMAGE SENSOR, ELECTRONIC DEVICE INCLUDING THE SAME, AND AUTO-FOCUSING METHOD OF IMAGE SENSOR

(71) Applicant: SAMSUNG ELECTRONICS CO., LTD., Suwon-si (KR)

(72) Inventors: Soongeun Jang, Suwon-si (KR); Sookyoung Roh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 34 days.

(21) Appl. No.: 19/188,837

(22) Filed: Apr. 24, 2025

(65) Prior Publication Data

US 2026/0075333 A1 Mar. 12, 2026

(30) Foreign Application Priority Data

Sep. 6, 2024 (KR) ........................ 10-2024-0121786

(51) Int. Cl.
*H04N 25/704* (2023.01)
*G02B 5/02* (2006.01)
(Continued)

(52) U.S. Cl.
CPC ....... *H04N 25/704* (2023.01); *G02B 27/1013* (2013.01); *G02B 27/123* (2013.01); *H04N 23/672* (2023.01)

(58) Field of Classification Search
CPC ............... H04N 25/704; H04N 23/672; H04N 1/0289; H04N 9/28; G02B 27/1013;
(Continued)

(56) References Cited

U.S. PATENT DOCUMENTS 11,558,587 B2 1/2023 Jang et al.
12,541,113 B2 * 2/2026 Lee .................... G02B 27/1013
2015/0286060 A1 * 10/2015 Roh ....................... G02B 27/12 250/226

(Continued)

FOREIGN PATENT DOCUMENTS

KR 10-2014-0113923 A 9/2014
KR 10-2021-0135380 A 11/2021

(Continued)

OTHER PUBLICATIONS

Rush et al., "X3 Sensor Characteristics", Journal of the Society of Photographic Science and Technology of Japan, Feb. 25, 2003, 4 total pages, vol. 66, doi:10.11454/PHOTOGRST1964.66.57.
Webpage, "Foveon X3 sensor", Wikipedia, 8 total pages, https://en.wikipedia.org/wiki/Foveon_X3_sensor#Color_artifacts, downloaded Dec. 3, 2024.

*Primary Examiner* — Marly S Camargo
(74) *Attorney, Agent, or Firm* — Sughrue Mion, PLLC

(57) ABSTRACT

Provided are an image sensor, an electronic device including the image sensor, and an auto-focusing method. The image sensor includes a sensor substrate having a plurality of unit patterns each including a first unit pixel, a second unit pixel, a third unit pixel, and a fourth unit pixel, a color separating lens array provided above the sensor substrate and including a plurality of nanoposts that are configured to separate incident light according to wavelengths in each unit pixel and condense the incident light onto corresponding pixels, and an optical diffuser provided on the color separating lens array, wherein each of the first to fourth unit pixels includes four or more pixels that have a complementary pattern structure of a diagonal arrangement.

20 Claims, 14 Drawing Sheets

(51) Int. Cl.

| | |
|---|---|
| ***G02B 7/09*** | (2021.01) |
| ***G02B 7/28*** | (2021.01) |
| ***G02B 27/10*** | (2006.01) |
| ***G02B 27/12*** | (2006.01) |
| ***H04N 23/67*** | (2023.01) |

(58) Field of Classification Search

CPC .................... G02B 27/123; G02B 7/09; G02B 7/28–32; G02B 27/0075; G02B 5/02; G02B 5/0205; G02B 5/021; G02B 5/0263; G02B 6/0051; H01F 39/8063; H10F 39/8053; H10F 39/806; H10F 39/802; H10F 39/803; H10F 39/182

See application file for complete search history.

(56) References Cited

U.S. PATENT DOCUMENTS

| | | | | |
|---|---|---|---|---|
| 2015/0304582 | A1 | 10/2015 | Hirota | |
| 2021/0344882 | A1 | 11/2021 | Park et al. | |
| 2022/0093666 | A1 | 3/2022 | Koskinen et al. | |
| 2023/0412933 | A1 | 12/2023 | Cha | |
| 2024/0040273 | A1* | 2/2024 | Roh | H04N 25/17 |
| 2024/0145518 | A1 | 5/2024 | Yahata | |
| 2026/0096230 | A1* | 4/2026 | Roh | G01J 3/0208 |
| 2026/0164127 | A1* | 6/2026 | Jang | G02B 27/1013 |

FOREIGN PATENT DOCUMENTS

| | | | |
|---|---|---|---|
| KR | 10-2412278 | B1 | 6/2022 |
| KR | 10-2023-0173508 | A | 12/2023 |
| KR | 10-2024-0059879 | A | 5/2024 |

* cited by examiner

IMAGE SENSOR, ELECTRONIC DEVICE INCLUDING THE SAME, AND AUTO-FOCUSING METHOD OF IMAGE SENSOR

CROSS-REFERENCE TO RELATED APPLICATION

This application is based on and claims priority under 35 U.S.C. § 119 to Korean Patent Application No. 10-2024-0121786, filed on Sep. 6, 2024, in the Korean Intellectual Property Office, the disclosure of which is incorporated by reference herein in its entirety.

BACKGROUND

1. Field

The disclosure relates to an image sensor, an electronic device including the same, and an auto-focusing method performed by the image sensor, and in particular, to an image sensor having a meta-pixel structure and including a pixel array having a complementary pattern structure in a diagonal arrangement, an electronic device including the image sensor, and an auto-focusing method performed in the same.

2. Description of the Related Art

As the number of pixels in an image sensor gradually increases, the size of the pixels is required to be reduced. In order to reduce the size of the pixels, securing the amount of light and noise removal are significant issues.

Image sensors display images having various colors or sense colors of incident light usually using a color filter. However, a color filter may have low light utilization efficiency because the color filter absorbs light of colors other than the intended color of light. For example, when a red, green and blue (RGB) color filter is used, only ⅓ of incident light is transmitted, and the remaining ⅔ of the incident light is absorbed and thus, light usage efficiency is about 33% and light loss is very high.

Recently, in order to increase the light usage efficiency of the image sensors, attempts have been made to use a color separating lens array. The color separating lens array may separate the colors of the incident light using diffraction or refraction characteristics of other light according to wavelengths and may adjust directivity for each wavelength according to refractive indices and shapes. In a meta-pixel structure image sensor, colors are separated in a unit pixel by the color separating lens array and then may be transferred to corresponding pixels, respectively.

SUMMARY

One or more embodiments provide an image sensor having a meta-pixel structure, the image sensor including a pixel array having a complementary pattern structure of a diagonal arrangement.

One or more embodiments provide an electronic device including an image sensor including a pixel array having a complementary pattern structure of a diagonal arrangement.

One or more embodiments provide, in an image sensor of a meta-pixel structure, an auto-focusing method performed in an image sensor including a pixel array having a complementary pattern structure of a diagonal arrangement or an electronic device including the image sensor.

Additional aspects will be set forth in part in the description which follows and, in part, will be apparent from the description, or may be learned by practice of the presented embodiments of the disclosure.

According to an aspect of the disclosure, there is provided an image sensor including: a sensor substrate having a plurality of unit patterns, each of the plurality of unit patterns including a plurality of unit pixels, and the plurality of unit pixels including a first unit pixel, a second unit pixel, a third unit pixel, and a fourth unit pixel; a color separating lens array provided on the sensor substrate, the color separating lens array including a plurality of nanoposts that are configured to separate incident light according to wavelengths corresponding to each of the plurality of unit pixels and condense the incident light onto corresponding pixels in the plurality of unit pixels; and an optical diffuser provided on the color separating lens array, wherein each of the first to fourth unit pixels includes four or more pixels that have a complementary pattern structure of a diagonal arrangement.

Each of the first to fourth unit pixels may include a first pixel, a second pixel, a third pixel and a fourth pixel, the first to fourth pixels may be provided in a 2×2 arrangement in each of the plurality of unit pixels, and the first pixel is provided at a first row and a first column in each of the plurality of unit pixels, the second pixel is provided at a second row and a second column in each of the plurality of unit pixels, the third pixel is provided at the second row and the first column in each of the plurality of unit pixels, and the fourth pixel is provided at the first row and the second column in each of the plurality of unit pixels.

The first pixel and the second pixel provided in each of the first to fourth unit pixels are configured to sense light of primary colors, and the third pixel and the fourth pixel are configured to sense light of complementary colors with respect to the light of the primary colors sensed by the first pixel and the second pixel.

The first pixel and the second pixel have areas greater than areas of the third pixel and the fourth pixel.

The first to fourth unit pixels are provided in a 2×2 arrangement in a first unit pattern, among the plurality of unit patterns, and the first unit pixel is provided at a first row and a first column of the first unit pattern, the second unit pixel is provided at a second row and the first column of the first unit pattern, the third unit pixel is provided at the first row and the second column of the first unit pattern, and the fourth unit pixel is provided at the second row and the second column of the first unit pattern.

Each of the first to fourth unit pixels includes a first pixel, a second pixel, a third pixel and a fourth pixel, and the first pixel and the second pixel in the first unit pixel and the fourth unit pixel are configured to sense green light, the third pixel and the fourth pixel in the first unit pixel and the fourth unit pixel are configured to sense magenta light, the first pixel and the second pixel of the second unit pixel are configured to sense blue light, the third pixel and the fourth pixel of the second unit pixel are configured to sense yellow light, the first pixel and the second pixel of the third unit pixel are configured to sense red light, and the third pixel and the fourth pixel of the third unit pixel are configured to sense cyan light.

According to an aspect of the disclosure, there is provided an electronic device including: a lens assembly including one or more lenses, the lens assembly configured to form an optical image of an object; an image sensor configured to convert the optical image formed by the lens assembly into an electrical signal; and a processor configured to process the signal generated by the image sensor, wherein the image sensor includes: a sensor substrate having a plurality of unit patterns, each of the plurality of unit patterns including a plurality of unit pixels, and the plurality of unit pixels including a first unit pixel, a second unit pixel, a third unit pixel, and a fourth unit pixel; a color separating lens array provided on the sensor substrate, the color separating lens array including a plurality of nanoposts that are configured to separate incident light according to wavelengths corresponding to each of the plurality of unit pixels and condense the incident light onto corresponding pixels in the plurality of unit pixels; and an optical diffuser provided on the color separating lens array, wherein each of the first to fourth unit pixels includes four or more pixels that have a complementary pattern structure of a diagonal arrangement.

According to an aspect of the disclosure, there is provided an auto-focusing method performed by an image sensor, the auto-focusing method including: selecting an auto-focusing position; obtaining data of selected region from four or more pixels provided in each of a first unit pixel, a second unit pixel, a third unit pixel and a fourth unit pixel in a unit pattern; obtaining a vertical sum or a horizontal sum of data corresponding to the four or more pixels provided in each of the first to fourth unit pixels; obtaining one of a vertical phase difference signal based on the vertical sum of the data corresponding to the four or more pixels or a horizontal phase difference signal based on the horizontal sum of the data corresponding to the four or more pixels; obtaining a distance between an object and an image sensor based on the vertical phase difference signal or the horizontal phase difference signal; and adjusting a focusing lens based on the distance between the object and the image sensor, wherein the four or more pixels have a complementary pattern structure of a diagonal arrangement.

The obtaining the vertical phase difference signal may include: obtaining first horizontal sum data based on first data from two or more pixels provided in a first row in each of a plurality of unit pixels; obtaining second horizontal sum data based on second data from two or more pixels provided in a second row in each of the plurality of unit pixels; and obtaining the vertical phase difference signal based on the first horizontal sum data and the second horizontal sum data.

The obtaining the horizontal phase difference signal may include: obtaining first vertical sum data based on first data from two or more pixels provided in a first column in each of a plurality of unit pixels; obtaining second vertical sum data based on second data from two or more pixels provided in a second column in each of the plurality of unit pixels; and obtaining the horizontal phase difference signal based on the first vertical sum data and the second vertical sum data.

1The auto-focusing method may further include selecting one of the vertical phase difference signal and the horizontal phase difference signal by comparing the vertical phase difference signal or horizontal phase difference signal with information stored in a table.

Each of the first to fourth unit pixels includes a first pixel, a second pixel, a third pixel and a fourth pixel provided in a 2×2 arrangement, and the first pixel is provided at a first row and a first column in each of a plurality of unit pixels, the second pixel is provided at a second row and a second column in each of the plurality of unit pixels, the third pixel is provided at the second row and the first column in each of the plurality of unit pixels, and the fourth pixel is provided at the first row and the second column in each of the plurality of unit pixels.

The first pixel and the second pixel provided in each of the first to fourth unit pixels are configured to sense light of primary colors, and the third pixel and the fourth pixel are configured to sense light of complementary colors with respect to a primary color light sensed by the first pixel and the second pixel.

The first to fourth unit pixels are provided in a 2×2 arrangement in the unit pattern, and the first unit pixel is provided at a first row and a first column of the unit pattern, the second unit pixel is provided at a second row and the first column of the unit pattern, the third unit pixel is provided at the first row and the second column of the unit pattern, and the fourth unit pixel is provided at the second row and the second column of the unit pattern.

The first pixel and the second pixel in the first unit pixel and the fourth unit pixel are configured to sense green light, the third pixel and the fourth pixel in the first unit pixel and the fourth unit pixel are configured to sense magenta light, the first pixel and the second pixel of the second unit pixel are configured to sense blue light, the third pixel and the fourth pixel of the second unit pixel are configured to sense yellow light, the first pixel and the second pixel of the third unit pixel are configured to sense red light, and the third pixel and the fourth pixel of the third unit pixel are configured to sense cyan light.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
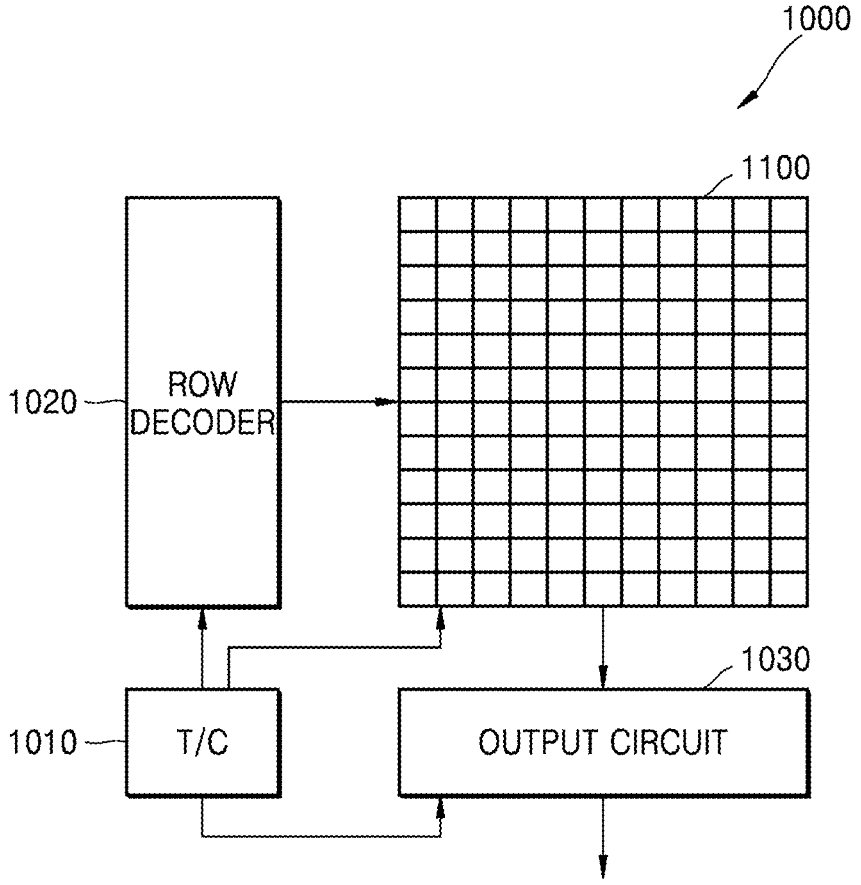
FIG. 1 is a block diagram schematically showing an image sensor according to an embodiment.

Reference will now be made in detail to embodiments, examples of which are illustrated in the accompanying drawings, wherein like reference numerals refer to like elements throughout. In this regard, the embodiments of the disclosure may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, an image sensor including a color separating lens array and an electronic device including the image sensor will be described in detail with reference to accompanying drawings. The embodiments of the disclosure are capable of various modifications and may be embodied in many different forms. In the drawings, like reference numerals denote like components, and sizes of components in the drawings may be exaggerated for convenience of explanation.

When a layer, a film, a region, or a panel is referred to as being "on" another element, it may be directly on/under/at left/right sides of the other layer or substrate, or intervening layers may also be present.

It will be understood that although the terms "first," "second," etc. may be used herein to describe various components, these components should not be limited by these terms. These components are only used to distinguish one component from another. These terms do not limit that materials or structures of components are different from one another.

An expression used in the singular encompasses the expression of the plural, unless it has a clearly different meaning in the context. It will be further understood that when a portion is referred to as "comprising" another component, the portion may not exclude another component but may further comprise another component unless the context states otherwise.

In addition, the terms such as " . . . unit", "module", etc. provided herein indicates a unit performing at least one function or operation, and may be realized by hardware, software, or a combination of hardware and software.

The use of the terms of "the above-described" and similar indicative terms may correspond to both the singular forms and the plural forms. Also, the use of all exemplary terms (for example, etc.) is only to describe a technical spirit in detail, and the scope of rights is not limited by these terms unless the context is limited by the claims.

FIG. 1 is a schematic block diagram of an image sensor 1000.

Referring to FIG. 1, the image sensor 1000 may include a pixel array 1100, a timing controller (T/C) 1010, a row decoder 1020, and an output circuit 1030. The image sensor 1000 may be a charge-coupled device (CCD) image sensor or a complementary metal oxide semiconductor (CMOS) image sensor.

The pixel array 1100 may include pixels that are two-dimensionally provided in a plurality of rows and columns. The row decoder 1020 may select one of the rows in the pixel array 1100 based on a row address signal output from the timing controller 1010. For example, the row decoder 1020 may select one of the rows in the pixel array 1100 in response to the row address signal output from the timing controller 1010. The output circuit 1030 outputs a photosensitive signal from a plurality of pixels provided in the selected row in a column unit. For example, the output circuit 1030 may include a column decoder and an analog-to-digital converter (ADC). For example, the output circuit 1030 may include a plurality of ADCs that are respectively provided in columns between the column decoder and the pixel array 1100, or one ADC provided at an output end of the column decoder. The timing controller 1010, the row decoder 1020, and the output circuit 1030 may be implemented as one chip or as separate chips. A processor for processing an image signal output from the output circuit 1030 may be implemented as one chip with the timing controller 1010, the row decoder 1020, and the output circuit 1030.

The pixel array 1100 may include a plurality of pixels that sense light of different wavelengths. The pixel arrangement in the pixel array 1100 may be implemented in various ways, for example, the pixel array 1100 may have the pixel arrangement described below.

Figure 2:
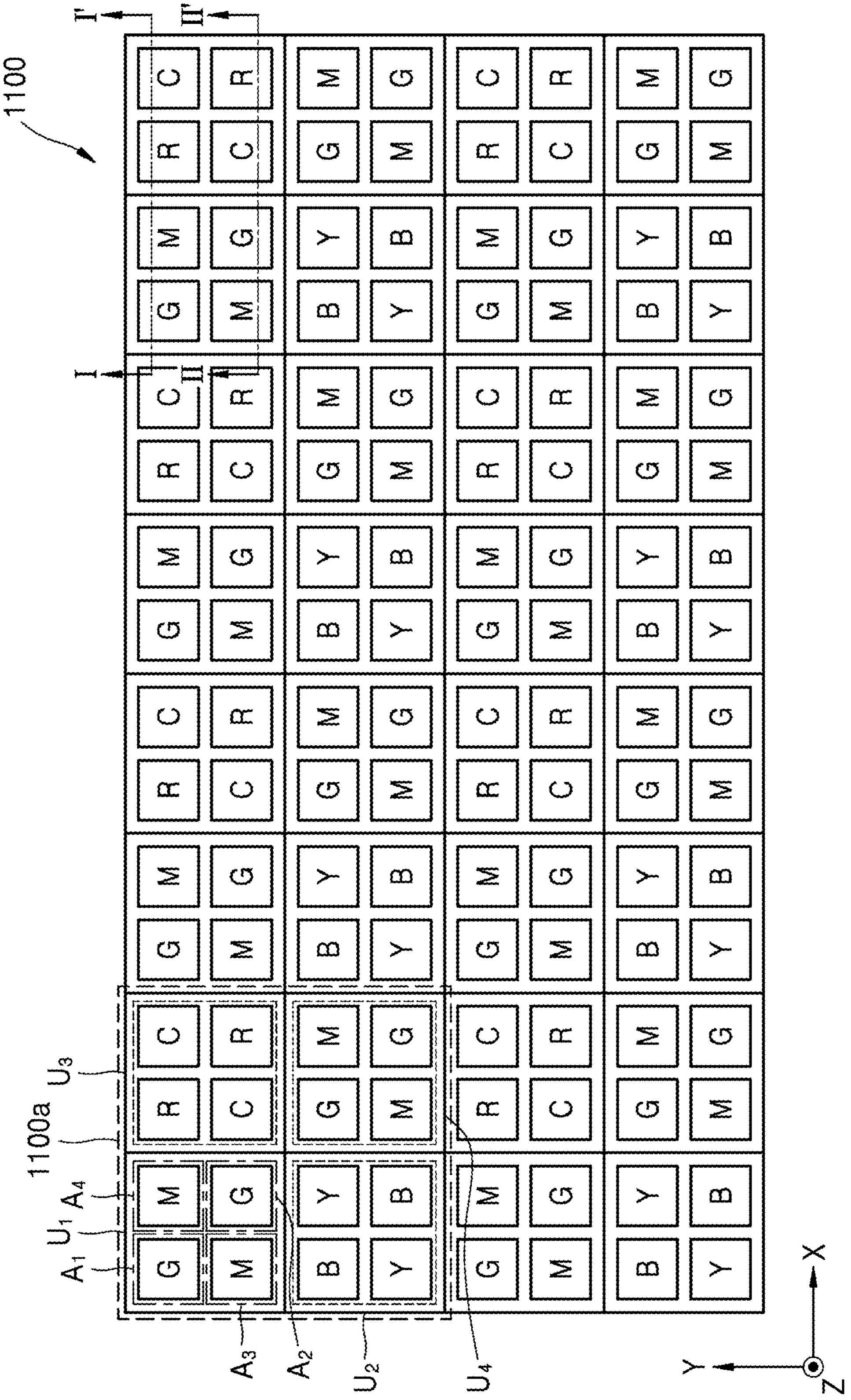
FIG. 2 is a plan view schematically showing a pixel array in an image sensor according to an embodiment.

FIG. 2 is a plan view schematically showing a pixel array in an image sensor according to an embodiment.

Referring to FIG. 2, one unit pattern **1100*a* may include a plurality of unit pixels that may include four or more pixels. For example, one unit pattern 1100*a*** may include first to fourth unit pixels $U_1$, $U_2$, $U_3$, and $U_4$, each of which may include first to fourth quadrant regions $A_1$, $A_2$, $A_3$, and $A_4$.

One unit pattern **1100*a* may include the first to fourth unit pixels $U_1$, $U_2$, $U_3$, and $U_4$ in a 2×2 arrangement. For example, the first unit pixel $U_1$ may be located at a first row and a first column in the unit pattern 1100*a*, the second unit pixel $U_2$ may be located at a second row and the first column in the unit pattern 1100*a*, the third unit pixel $U_3$ may be located at the first row and a second column in the unit pattern 1100*a*, and the fourth unit pixel $U_4$ may be located at the second row and the second column in the unit pattern 1100*a***.

Each of the first to fourth unit pixels $U_1$, $U_2$, $U_3$, and $U_4$ may include the first to fourth quadrant regions $A_1$, $A_2$, $A_3$, and $A_4$ in a 2×2 arrangement. The first quadrant region $A_1$ may be located at a first row and a first column in each of the first to fourth units pixels $U_1$, $U_2$, $U_3$, and $U_4$, the second quadrant region $A_2$ may be located at a second row and the second column in each of the first to fourth unit pixels $U_1$, $U_2$, $U_3$, and $U_4$, the third quadrant region $A_3$ may be located at the second row and the first column in each of the first to fourth unit pixels $U_1$, $U_2$, $U_3$, and $U_4$, and the fourth quadrant region $A_4$ may be located at the first row and the second column in each of the first to fourth unit pixels $U_1$, $U_2$, $U_3$, and $U_4$.

In each of the first to fourth quadrant regions $A_1$, $A_2$, $A_3$, and $A_4$, one of the pixels may be provided. For example, a first pixel configured to sense light of a first wavelength may be provided in the first quadrant region $A_1$ (first row, first column) of the first unit pixel $U_1$, a second pixel configured to sense light of the first wavelength may be provided in the second quadrant region $A_2$ (second row, second column) of the first unit pixel $U_1$, a third pixel configured to sense light of a second wavelength may be provided in the third quadrant region $A_3$ (second row, first column) of the first unit pixel $U_3$, and a fourth pixel configured to sense light of the second wavelength may be provided in the fourth quadrant region $A_4$ (first row, second column) of the first unit pixel $U_1$. The light of the first wavelength and the light of the second wavelength may be complementary. For example, in the first to fourth quadrant regions $A_1$, $A_2$, $A_3$, and $A_4$ of the first unit pixel $U_1$, a green pixel G, a green pixel G, a magenta pixel M, and a magenta pixel M may be respectively provided as shown in FIG. 2.

Likewise, in each of the second to fourth unit pixels $U_2$, $U_3$, and $U_4$, first and second pixels and third and fourth pixels that are configured to sense the light in a complementary relationship may be arranged diagonally in the 2×2 arrangement. For example, as shown in FIG. 2, the first, second, third, and fourth pixels of the second unit pixel $U_2$ may be respectively a blue pixel B, a blue pixel B, a yellow pixel Y, and a yellow pixel Y, the first, second, third, and fourth pixels of the third unit pixel $U_3$ may be respectively a red pixel R, a red pixel R, a cyan pixel C, and a cyan pixel C, and the first, second, third, and fourth pixels of the fourth unit pixel $U_4$ may be respectively a green pixel G, a green pixel G, a magenta pixel M, and a magenta pixel M.

As described above, a pattern structure in which the plurality of unit pixels U1, U2, U3, and U4 in the unit pattern 1100*a* of the pixel array 1100 each include a plurality of primary pixels R, G, or B, and a plurality of complementary pixels C, M, or Y, the plurality of primary pixels R, G, or B are arranged in the diagonal direction in the unit pixel, and the plurality of complementary pixels C, M, or Y are arranged in the diagonal direction in the unit pixel may be referred to as "complementary pattern structure of diagonal arrangement". For example, a first green pixel G and a second green pixel G are diagonally arranged with respect to each other in the first unit pixel U1, and a first magenta pixel M and a second magenta pixel M are diagonally arranged with respect to each other in the first unit pixel U1. For example, a first blue pixel B and a second blue pixel B are diagonally arranged with respect to each other in the second unit pixel U2, and a first yellow pixel Y and a second yellow pixel Y are diagonally arranged with respect to each other in the second unit pixel U2. For example, a first red pixel R and a second red pixel R are diagonally arranged with respect to each other in the third unit pixel U3, and a first cyan pixel C and a second cyan pixel C are diagonally arranged with respect to each other in the third unit pixel U3.

In the entire pixel arrangement, one unit pattern 1100*a* may have pixels arranged in 4×4 arrangement, and the unit patterns 1100*a* may be two-dimensionally arranged repeatedly in a first direction (X-direction) and a second direction (Y-direction).

In addition, the arrangement of the pixel array 1100 of FIG. 2 is an example, and the pixel array 1100 may have diagonal arrangement complementary pattern structures of various combinations. Hereinafter, an example in which the pixel array 1100 has the complementary pattern structure of diagonal arrangement as shown in FIG. 2 is described below. However, the descriptions provided below are not limited thereto, but may be also applied to a pixel array having various complementary pattern structures of diagonal arrangement.

Figure 3:
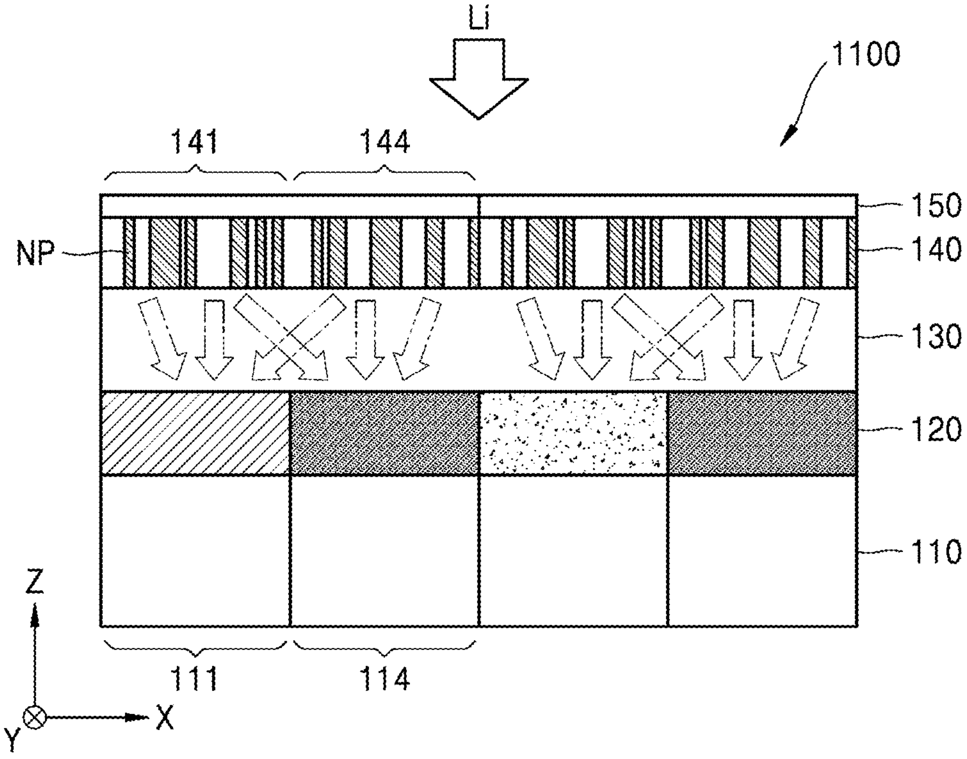
FIG. 3 is a cross-sectional view taken along line I-I' of FIG. 2.
Figure 4:
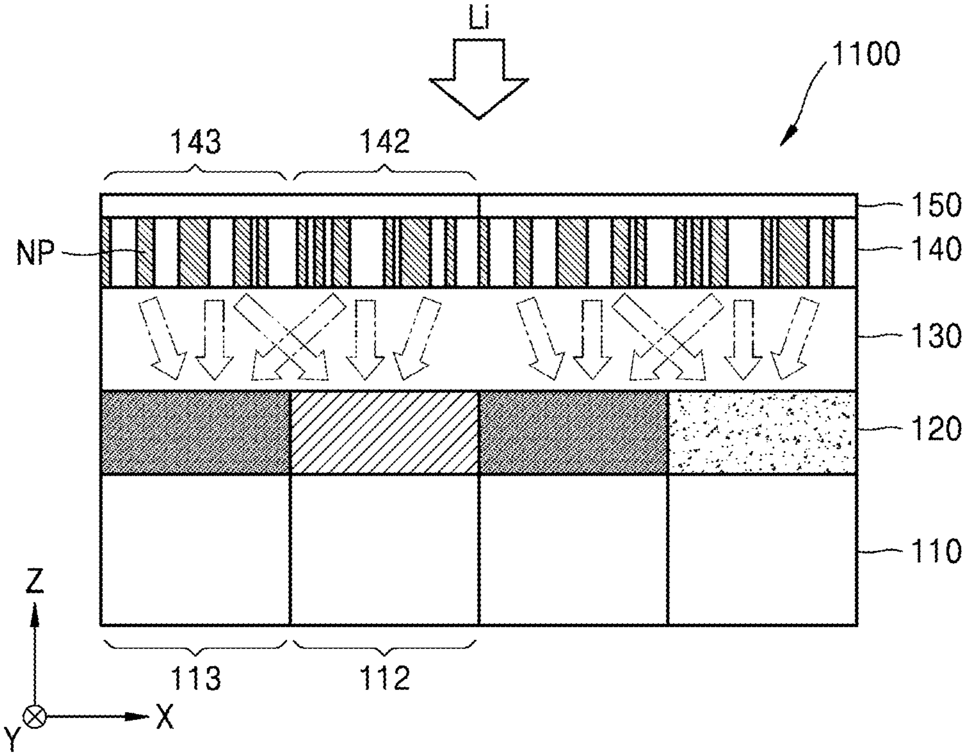
FIG. 4 is a cross-sectional view taken along line II-II' of FIG. 2.

FIGS. 3 and 4 are cross-sectional views schematically showing a structure of a pixel array in an image sensor according to an embodiment. FIG. 3 is a cross-sectional view taken along line I-I' of FIG. 2, and FIG. 4 is a cross-sectional view taken along line II-II' of FIG. 2.

Referring to FIGS. 3 and 4, the pixel array 1100 may include the sensor substrate 110, the color filter layer 120 provided on the sensor substrate 110, the spacer layer 130 provided on the color filter layer 120, a color separating lens array 140 provided on the spacer layer 130, and an optical diffuser 150 provided on the color separating lens array 140.

The sensor substrate 110 may include first to fourth photosensitive cells 111, 112, 113, and 114 converting light into electrical signals. The first to fourth photosensitive cells 111, 112, 113, and 114 may be respectively provided in the pixels. The regions are classified in order to separately sense incident light through the unit patterns, for example, the first photosensitive cell 111 and the second photosensitive cell 112 may sense the light of the first wavelength, and the third and fourth photosensitive cells 113 and 114 may sense the light of the second wavelength. The light of the first wavelength and the light of the second wavelength may be complementary. The first to fourth photosensitive cells 111, 112, 113, and 114 may be provided in the 2×2 arrangement. The first and fourth photosensitive cells 111 and 114 may be arranged in the first direction (X-direction), and the first and third photosensitive cells 111 and 113 may be arranged in the second direction (Y-direction). The first and second photosensitive cells 111 and 112 may be arranged in the diagonal direction, and the third and fourth photosensitive cells 113 and 114 may be arranged in the diagonal direction.

The spacer layer 130 is provided between the sensor substrate 110 and the color separating lens array 130 in order to maintain a gap between the sensor substrate 110 and the color separating lens array 130 constant. The spacer layer 130 may be configured to secure a focal length of the color separating lens array 140. The spacer layer 130 may include a transparent material with respect to visible light. For example, the spacer layer 130 may include a dielectric material having a lower refractive index than that of nanoposts NP in the color separating lens array 140 and low absorbent ratio in the visible ray band, e.g., $SiO_2$, siloxane-based spin on glass (SOG), etc.

The color separating lens array 140 may be partitioned in various ways. For example, the color separating lens array 140 may be partitioned into a first corresponding region 141 corresponding to the first photosensitive cell 111, a second corresponding region 142 corresponding to the second photosensitive cell 112, a third corresponding region 143 corresponding to the third photosensitive cell 113, and a fourth corresponding region 144 corresponding to the fourth photosensitive cell 114. For example, the first corresponding region 141 may correspond to the first photosensitive cell 111 and may be provided above the first photosensitive cell 111, and the second corresponding region 142 may correspond to the second photosensitive cell 112 and may be provided above the second photosensitive cell 112. For example, referring to FIGS. 3 and 4, the first to fourth corresponding regions 141, 142, 143, and 144 of the color separating lens array 140 may be provided to face the corresponding first to fourth photosensitive cells 111, 112, 113, and 114. The first to fourth corresponding regions 141, 142, 143, and 144 may be provided diagonally in the 2×2 arrangement in the first direction (X-direction) and the second direction (Y-direction). The color separating lens array 140 may include a plurality of nanoposts NP in each of the first to fourth corresponding regions 141, 142, 143, and 144. The nanoposts NP of the color separating lens array 140 may be configured to allow color separation, that is, incident light is separated according to wavelengths, to be generated only between adjacent pixels. The nanoposts NP of the color separating lens array 140 may be formed to generate the color separation in the unit pixel arrangement (2×2 arrangement). For example, the color separating lens array 140 may be formed to condense the light of first wavelength included in incident light Li incident on the first to fourth corresponding regions 141, 142, 143, and 144 to the first photosensitive cell 111 and the second photosensitive cell 112, and to condense the light of second wavelength included in the incident light Li incident on the first to fourth corresponding regions 141, 142, 143, and 144 to the third photosensitive cell 113 and the fourth photosensitive cell 114.

The nanoposts NP of the color separating lens array 140 may be configured to allow the color separation to occur only in the unit pixel arrangement by forming different phase profiles with respect to the light of the first wavelength and the light of the second wavelength included in the incident light Li. Because a refractive index of a material varies depending on a wavelength of light, the color separating lens array 140 may provide different phase profiles with respect to the light of the first wavelength and the light of the second wavelength. In other words, because the same material has a different refractive index according to the wavelength of light reacting with the material and a phase delay of the light that passes through the material is different according to the wavelength, the phase profile may vary depending on the wavelength. For example, the refractive index of the first corresponding region 141 with respect to the light of the first wavelength and the refractive index of the first corresponding region 141 with respect to the light of the second wavelength may be different from each other, and the phase delay of the light of the first wavelength passing through the first corresponding region 141 and the phase delay of the light of the second wavelength passing through the first corresponding region 141 may be different from each other. For example, the phase delay that occurs in the light of the first wavelength passing through the first corresponding region 141 may be different from the phase delay that occurs in the light of the second wavelength passing through the first corresponding region 141. Thus, in an example case in which the color separating lens array 140 is designed in consideration of the characteristics of light, the phase profiles different with respect to the light of the first wavelength and the second wavelength may be provided. For example, the first to fourth corresponding regions 141, 142, 143, and 144 of the color separating lens array 140 may each include, for example, the plurality of nanoposts NP of cylindrical shapes.

Each of the first to fourth corresponding regions 141, 142, 143, and 144 of the color separating lens array 140 may be provided with one or more nanoposts NP, and the nanoposts NP may have different shapes, sizes, intervals, and/or arrangements according to the regions. For example, the first to fourth corresponding regions 141, 142, 143, and 144 may each include one or more nanoposts NP. The sizes, shapes, intervals, and/or arrangements of the nanoposts NP may be configured so that, in the incident light incident on the first to fourth corresponding regions 141, 142, 143, and 144 through the color separating lens array 140, the light of the first wavelength may be condensed onto the first and second photosensitive cells 111 and 112, and the light of the second wavelength may be condensed onto the third and fourth photosensitive cells 113 and 114.

A cross-sectional diameter of the nanoposts NP may have sub-wavelength dimension. Here, the sub-wavelength refers to a wavelength that is less than a wavelength band of light to be branched. The nanoposts NP may have a dimension, for example, less than the first wavelength and the second wavelength according to the corresponding regions. In an example case in which the incident light Li is a visible ray, the cross-sectional diameter of the nanoposts NP may be less than, for example, 400 nm, 300 nm, or 200 nm. According to an embodiment, the nanoposts NP may be obtained by combining two or more posts stacked in the height direction (Z direction). Also, the color separating lens array 140 includes one single layer, but the color separating lens array 140 may have a structure in which a plurality of layers are stacked.

The nanoposts NP may include a material having a relatively higher refractive index as compared with a peripheral material and having a relatively lower absorption ratio in the visible ray band. For example, the nanoposts NP may include, but is not limited to, c-Si, p-Si, a-Si and a Group III-V compound semiconductor (GaP, GaN, GaAs etc.), SiC, $TiO_2$, $SiN_3$, ZnS, ZnSe, $Si_3N_4$, and/or a combination thereof. Periphery of the nanoposts NP may be filled with a dielectric material having a relatively lower refractive index as compared with the nanoposts NP and have a relatively low absorption ratio in the visible ray band. For example, the periphery of the nanoposts NP may be filled with $SiO_2$, siloxane-based spin on glass (SOG), air, etc. The nanoposts NP having a difference in a refractive index between the refractive index of the peripheral material may change a phase of light that passes therethrough. A degree of delaying the phase due to the color separating lens array 140 may be determined by detailed dimensions, arrangement types, etc. of the nanoposts NP.

The optical diffuser 150 may be provided on the color separating lens array 140. The optical diffuser 150 may disperse the incident light Li incident on the unit pixel arrangement (or 2×2 arrangement) and distribute evenly to the entire first to fourth corresponding regions 141, 142, 143, and 144. The optical diffuser 150 may be partitioned for every 2×2 arrangement, in correspondence with the unit pixel arrangement. Most of the incident light Li incident on the unit pixel arrangement may lose the directivity due to the optical diffuser 150 and may be incident on the color separating lens array 140. Some of the incident light Li incident on the unit pixel arrangement may be incident on the color separating lens array 140 without losing the directivity due to the optical diffuser 150. The light incident on the color separating lens array 140 after passing through the optical diffuser 150 may be color-separated in the unit pixel arrangement according to the wavelengths by the color separating lens array 140, and the light color-separated according to the wavelengths may be condensed onto the corresponding first to fourth photosensitive cells 111, 112, 113, and 114. As described above, a structure in which the color separation of the incident light in the unit pixel arrangement and the light is condensed onto the pixels of corresponding pixels respectively may be referred to as a meta-pixel structure.

According to an embodiment, FIG. 4 shows the optical diffuser 150 in the form of a thin film, but the shape of the optical diffuser 150 is not limited thereto. For example, the optical diffuser 150 may have a structure including one or more pillars like the color separating lens array 140 and may have a structure including one or more holes. Also, the optical diffuser 150 may be curved.

According to an embodiment, in the incident light Li, the light incident on the color separating lens array 140 without losing the directivity due to the optical diffuser 150 may be color-separated in the unit pixel arrangement according to the wavelengths by the color separating lens array 140. The color-separated light according to the wavelengths has a directivity eccentric to a certain direction from the center of the unit pixel, and is condensed onto the corresponding first to fourth photosensitive cell 111, 112, 113, or 114. Thus, an image having different parallax for the pixels of each color may be obtained, and a phase difference signal may be obtained therefrom.

Figure 5:
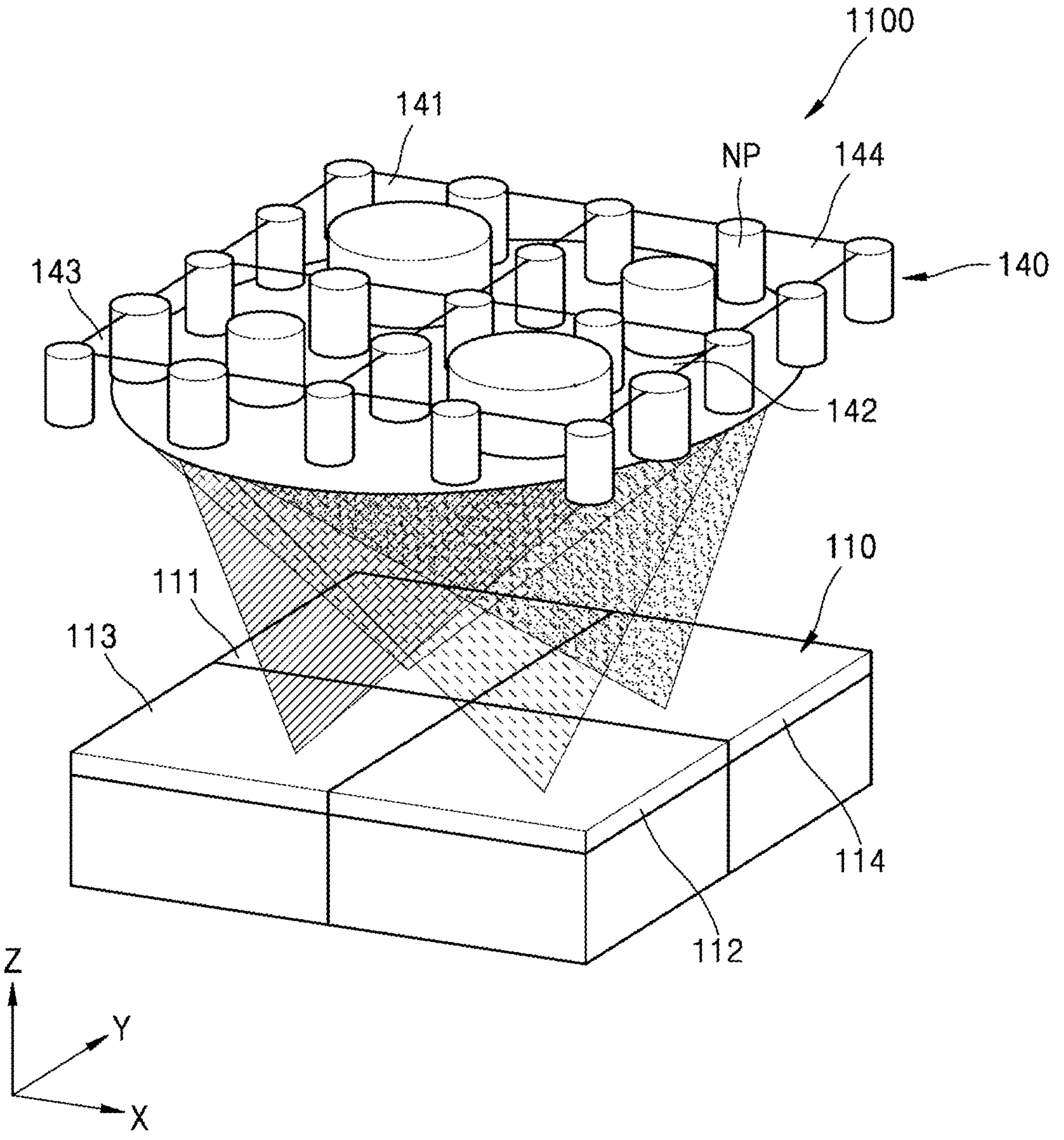
FIG. 5 is a perspective view schematically showing some components in a pixel array of an image sensor of FIG. 2, according to an embodiment.

FIG. 5 is a perspective view schematically showing some components in a pixel array of an image sensor of FIG. 2, according to an embodiment. FIG. 5 schematically shows some components only, so as to clarify separation and condensation of the incident light according to the wavelengths in the color separating lens array 140.

Referring to FIG. 5, the pixel array 1100 of the image sensor 1000 may include the sensor substrate 110 including an array of a plurality of photosensitive cells sensing the light, and the color separating lens array 140 provided on the sensor substrate 110 for separating and condensing light according to colors to make the light incident on the plurality of photosensitive cells.

The color separating lens array 140 may have a fine structure in each of the first to fourth corresponding regions 141, 142, 143, and 144 respectively corresponding to the first to fourth photosensitive cells 111, 112, 113, and 114, and is provided to form a phase profile that condenses light of different wavelengths onto the adjacent pixels in unit pixel arrangement so as to separate and condense the incident light according to the wavelengths. The fine structure of the color separating lens array 140 may include, as exemplarily shown in FIGS. 3 and 4, a plurality of nanoposts NP for forming the phase profile that condenses the light of different wavelengths onto the adjacent photosensitive cells in one unit pixel arrangement.

The color separating lens array 140 may include the first to fourth corresponding regions 141, 142, 143, and 144 that face the first to fourth photosensitive cells 111, 112, 113, and 114 of the sensor substrate 110 in one-to-one correspondence. For example, the color separating lens array 140 may include the first to fourth corresponding regions 141, 142, 143, and 144 facing the first to fourth photosensitive cells 111, 112, 113, and 114 of the sensor substrate 110 in one-to-one correspondence, and the first to fourth corresponding regions 141, 142, 143, and 144 may each include nanoposts NP so as to form the phase profile that condenses the light of different wavelengths onto the photosensitive cells adjacent to each other. For example, referring to FIG. 5, the nanoposts NP are arranged in the plurality of corresponding regions 141, 142, 143, and 144 and may condense the light only in the first to fourth corresponding regions 141, 142, 143, and 144.

The shapes, sizes, and arrangement of the nanoposts may be determined so that the light of a certain wavelength passed through the color separating lens array 140 forms the phase that is condensed onto the photosensitive cell corresponding to one of the first to fourth photosensitive cells 111, 112, 113, and 114 and the phase that does not proceed to the other photosensitive cells.

For example, the first photosensitive cell 111 senses the light of the first wavelength corresponding to the first pixel, the second photosensitive cell 112 senses the light of the first wavelength corresponding to the second pixel, the third photosensitive cell 113 senses the light of the second wavelength corresponding to the third pixel, and the fourth photosensitive cell 114 senses the light of the second wavelength corresponding to the fourth pixel. However, one or more embodiments are not limited thereto. According to an embodiment, a separator for separating cells may be further formed on a boundary between cells.

Figure 6:
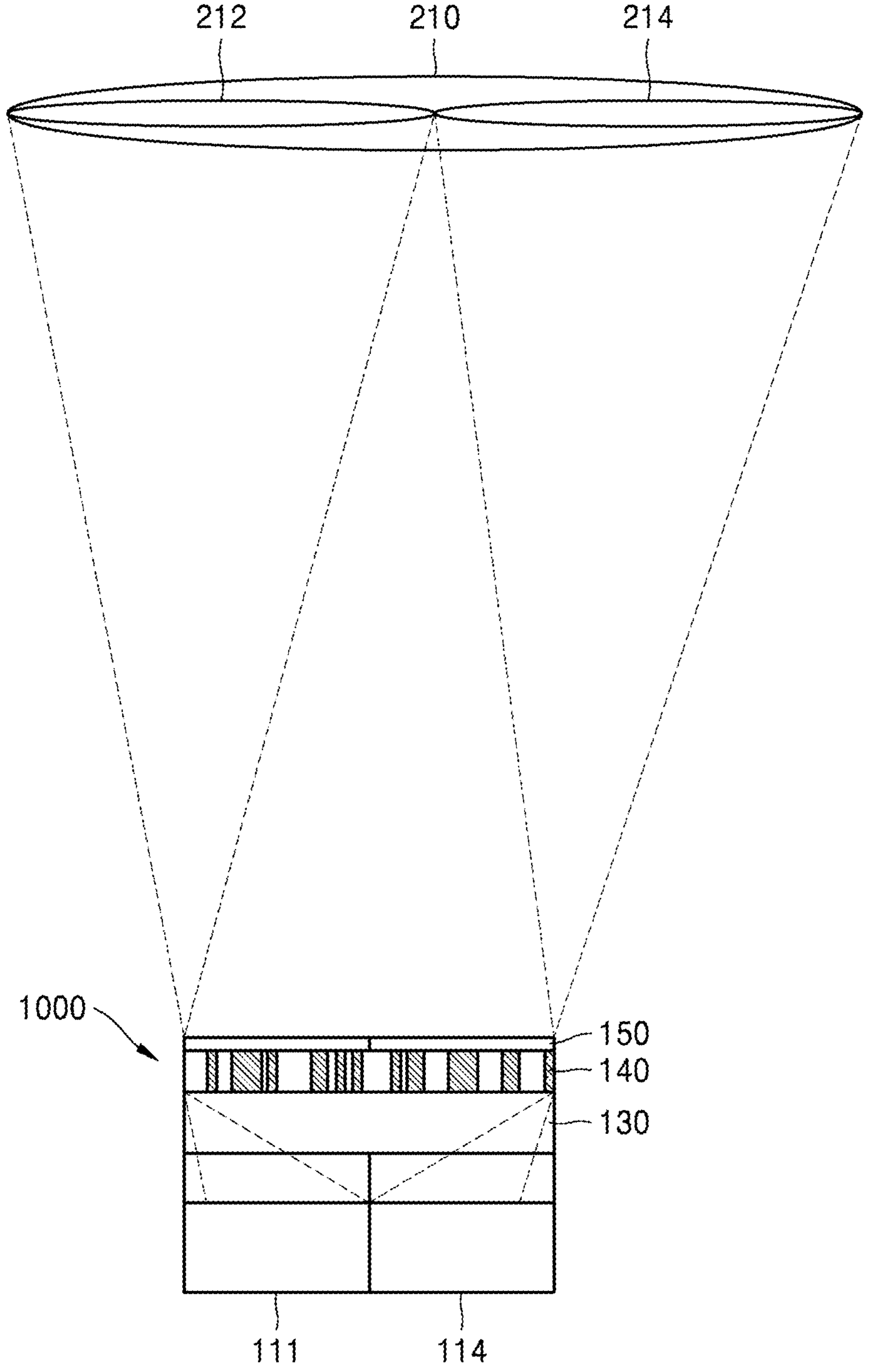
FIG. 6 is a diagram showing a parallax caused due to a phase difference between pixels in an image sensor according to an embodiment, and a relationship between angles of view of respective pixels caused therefrom.

FIG. 6 is a diagram showing a parallax caused due to a phase difference between pixels in an image sensor according to an embodiment, and a relationship between angles of view of respective pixels caused therefrom.

Referring to FIG. 6, the light after passing through an objective lens 210 may be incident on the image sensor 1000. The light from a right region 214 of the objective lens 210 is refracted by the color separating lens array 140 and incident on the first photosensitive cell 111 corresponding to the first pixel, and the light from a left region 212 of the objective lens 210 may be refracted by the color separating lens array 140 and incident on the fourth photosensitive cell 114 corresponding to the fourth pixel.

In addition, in order to obtain the phase difference signal, images having different parallax have to be obtained with respect to the data of the same color. For example, in order to obtain a horizontal phase difference signal, images corresponding to the right region 214 and the left region 212 of the objective lens 210 have to be secured with respect to the same color. For the convenience of description, FIG. 6 only shows the right region 214 and the left region 212 of the objective lens 210, but with respect to upper and lower regions of the objective lens 210, the data of the same color have to be secured in order to obtain a vertical phase difference signal.

Hereinafter, the auto-focusing method performed in the image sensor 1000 including the complementary pattern structure of diagonal arrangement described above is described below.

Figure 7:
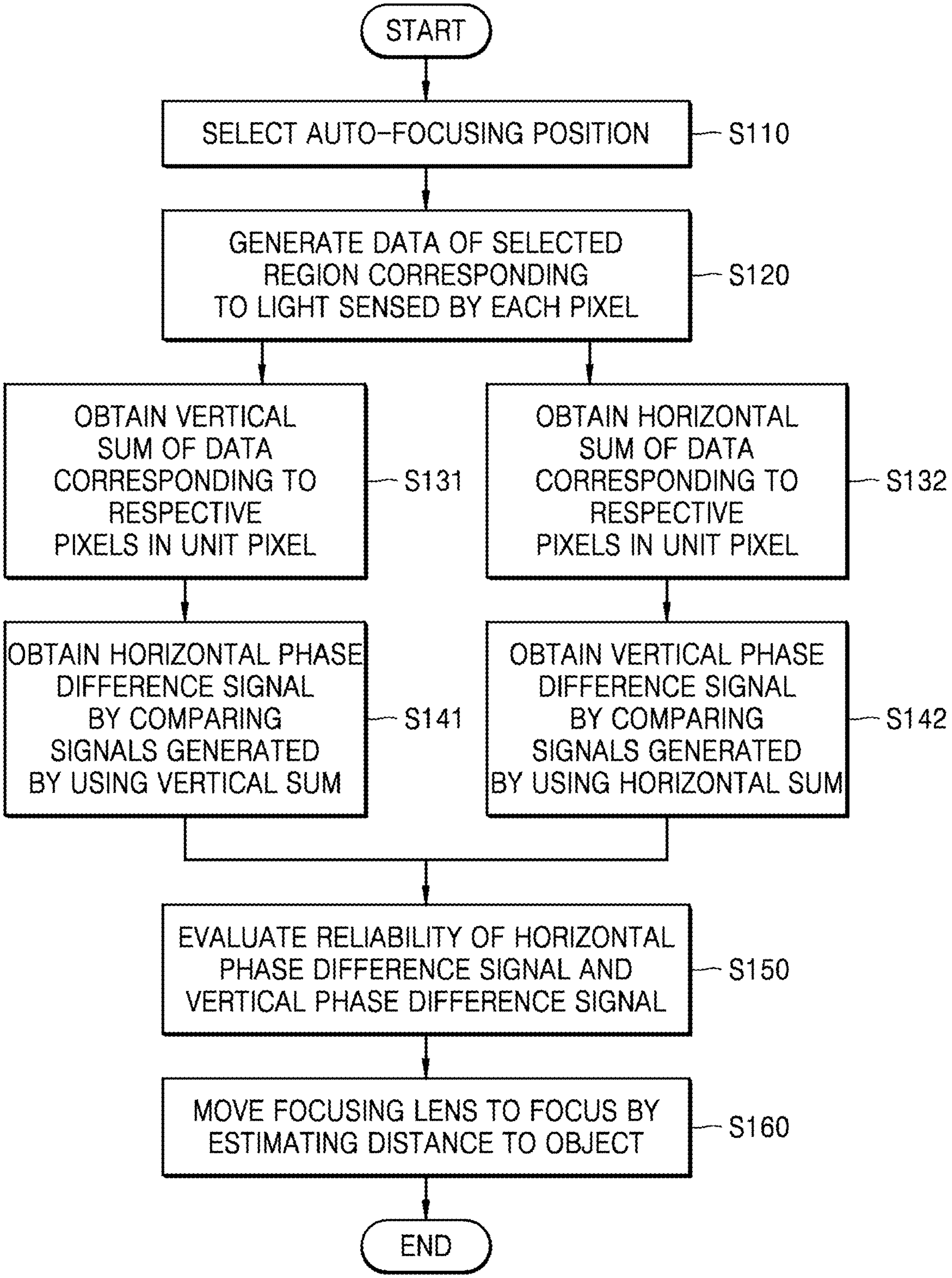
FIG. 7 is a flowchart illustrating an auto-focusing method according to an embodiment.

FIG. 7 is a flowchart illustrating an auto-focusing method according to an embodiment.

Referring to FIG. 7, the auto-focusing method according to an embodiment may include the following operations. However, the disclosure is not limited thereto, and as such, according to an embodiment, one or more operations may be added or omitted, and the order of the operations may vary. For example, in operation S110, the method may include selecting an auto-focusing position. The auto-focusing position selection may be performed, for example, by selecting a region (e.g., a center portion of a screen by touching a smartphone screen) by a user. In operation S120, the method may include obtaining data corresponding to light sensed by each pixel based on the auto-focusing position selection. For example, after selecting the auto-focusing position, data of the selected region may be obtained from respective pixels in the first to fourth unit pixels. Here, the selected region only may be photographed with 120 Hz. In operation S131, vertical sum data of each unit pixel is obtained by using the data obtained from each of the pixels in the first to fourth unit pixels, and in operation S132, a horizontal phase difference signal is obtained by comparing signals generated by using the vertical sum data. Also, in operation S132, horizontal sum data of each unit pixel is obtained by using the data obtained from each of the pixels in the first to fourth unit pixels, and in operation S142, a vertical phase difference signal is obtained by comparing the signals generated by using the horizontal sum data. A detailed method of obtaining the vertical sum data and the horizontal sum data is as follows.

Figure 8:
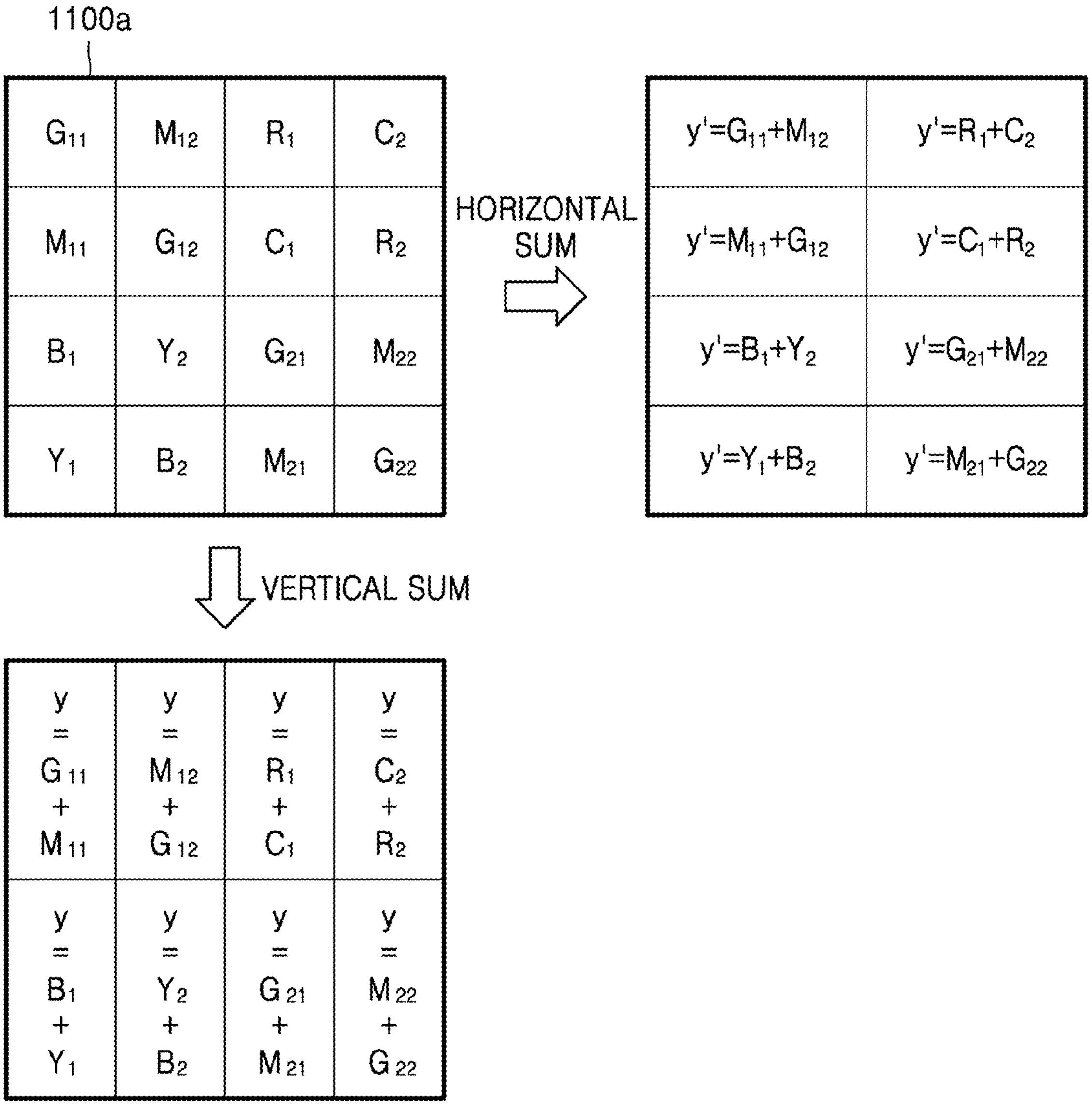
FIG. 8 is a diagram conceptually illustrating a method of obtaining vertical sum data or horizontal sum data of FIG. 7.

FIG. 8 is a diagram conceptually illustrating a method of obtaining vertical sum data or horizontal sum data of FIG. 7. For convenience of description, the description below is provided based on the unit pattern 1100*a* of FIG. 2.

Referring to FIG. 8, data obtained from two or more pixels (e.g., a first pixel $G_{11}$ and a third pixel $M_{11}$) provided in the first column in the first unit pixel $U_1$ in the unit pattern 1100*a* is binned, and data obtained from two or more pixels (e.g., a second pixel $G_{12}$ and a fourth pixel $M_{12}$) provided in a second column of the first unit pixel $U_1$ is binned. Also, data obtained from two or more pixels (e.g., a first pixel $B_1$ and a third pixel $Y_1$) provided in a first column of the second unit pixel $U_2$ in the unit pattern 1100*a* is binned, and data obtained from two or more pixels (e.g., a second pixel $B_2$ and a fourth pixel $Y_2$) provided in a second column of the second unit pixel $U_2$ is binned. Also, data obtained from two or more pixels (e.g., a first pixel $R_1$ and a third pixel $C_1$) provided in a first column of the third unit pixel $U_3$ in the unit pattern 1100*a* is binned, and data obtained from two or more pixels (e.g., a second pixel $R_2$ and a fourth pixel $C_2$) provided in a second column of the third unit pixel $U_3$ is binned. Also, data obtained from two or more pixels (e.g., a first pixel $G_{21}$ and a third pixel $M_{21}$) provided in a first column of the fourth unit pixel $U_4$ in the unit pattern 1100*a* is binned, and data obtained from two or more pixels (e.g., a second pixel $G_{22}$ and a fourth pixel $M_{22}$) provided in a second column of the fourth unit pixel $U_4$ is binned.

As described above, the data obtained from the pixels in the same column in each of the second, third, and fourth unit pixels $U_2$, $U_3$, and $U_4$ of the unit pattern 1100*a* may be binned to obtain the vertical sum data y.

Also, data obtained from two or more pixels (e.g., the first pixel $G_{11}$ and the fourth pixel $G_{12}$ of the first unit pixel $U_1$) provided in the first row of the unit pattern 1100*a* may be binned, and data obtained from two or more pixels (e.g., the second pixel $G_{12}$ and the third pixel $M_{11}$) provided in the second row of the first unit pixel $U_1$ may be binned. Also, data obtained from two or more pixels (e.g., the first pixel B and the fourth pixel $Y_2$) provided in a first row of a second unit pixel $U_2$ is binned, and data obtained from two or more pixels (e.g., the second pixel $B_2$ and the third pixel $Y_1$) provided in a second row of the second unit pixel $U_2$ is binned. Also, data obtained from two or more pixels (e.g., the first pixel $B_1$ and the fourth pixel $C_2$) provided in a first row of a third unit pixel $U_3$ is binned, and data obtained from two or more pixels (e.g., the second pixel $B_2$ and the third pixel $C_1$) provided in a second row of the third unit pixel $U_3$ is binned. Also, data obtained from two or more pixels (e.g., the first pixel $G_{21}$ and the fourth pixel $M_{22}$) provided in a first row of a fourth unit pixel $U_4$ is binned, and data obtained from two or more pixels (e.g., the second pixel $G_{22}$ and the third pixel $M_{21}$) provided in a second row of the fourth unit pixel $U_4$ is binned.

As described above, the data obtained from the pixels in the same row in each of the second, third, and fourth unit pixels $U_2$, $U_3$, and $U_4$ of the unit pattern 1100*a* may be binned to obtain the horizontal sum data y'.

The vertical sum data or the horizontal sum data may be obtained through an analog binning or a digital binning. After that, signals generated by using the vertical sum data are compared to obtain a horizontal phase difference signal, and signals generated by using the horizontal sum data are compared to obtain a vertical phase difference signal.

For example, signals generated by using first vertical sum data that is obtained by binning the data obtained from the first pixel $G_{11}$ and the third pixel Mi of the first unit pixel $U_1$ in the unit pattern 1100*a* and second vertical sum data that is obtained by binning the data obtained from the second pixel $G_{12}$ and the fourth pixel $M_{12}$ of the first unit pixel $U_1$ may be compared to obtain the horizontal phase difference signal.

Also, for example, signals generated by using first horizontal sum data that is obtained by binning the data obtained from the first pixel $G_{11}$ and the fourth pixel $M_{12}$ of the first unit pixel $U_1$ in the unit pattern 1100*a* and second horizontal sum data that is obtained by binning the data obtained from the second pixel $G_{12}$ and the third pixel Mi of the first unit pixel $U_1$ may be compared to obtain the vertical phase difference signal.

Referring back to FIG. 7, in operation S150, the method may include evaluating reliability of the horizontal phase difference signal and the vertical phase difference signal. For example, the horizontal phase difference signal and the vertical phase difference signal are compared and evaluated with values in a stored table in order to select a phase difference signal having high reliability. In the captured image, there may be an object that is located extremely in the vertical or horizontal direction, and accordingly, there may be a difference in the reliability. Therefore, reliabilities of the horizontal phase difference signal and the vertical phase difference signal may be compared. Relationship of a distance between an object and an image sensor with respect to the vertical or horizontal phase difference signal may be stored in advance in a table.

In operation S160, the method my include controlling the focusing lens based on a distance obtained using one of the vertical or horizontal phase difference signal. For example, after evaluating the reliability of the horizontal phase difference signal and the vertical phase difference signal, one of the horizontal phase difference signal and the vertical phase difference signal may be selected based on the reliability. For example, one of the horizontal phase difference signal and the vertical phase difference signal having a higher reliability value may be selected. According to an embodiment, a distance between the object and the image sensor may be calculated by using the selected phase difference signal and a table storing focusing lens movement information, and a focusing lens for auto-focusing, from among lenses of a camera, may be moved to a focusing position based on the calculated distance between the object and the image sensor. For example, the table may store in advance focusing lens movement information, which indicates how much the focusing lens is moved in back or forth direction in order to focus at a certain distance from the camera. Although FIG. 7 illustrates an example embodiment in which the both the vertical sum of data and the horizontal sum of data is obtained, the disclosure is not limited thereto, and as such, according to another embodiment, only one of the vertical sum of data and the horizontal sum of data may be obtained, and a distance between the object and the image sensor may be calculated by using the a phase difference signal obtained based on the one of the vertical sum of data and the horizontal sum of data.

Figure 9:
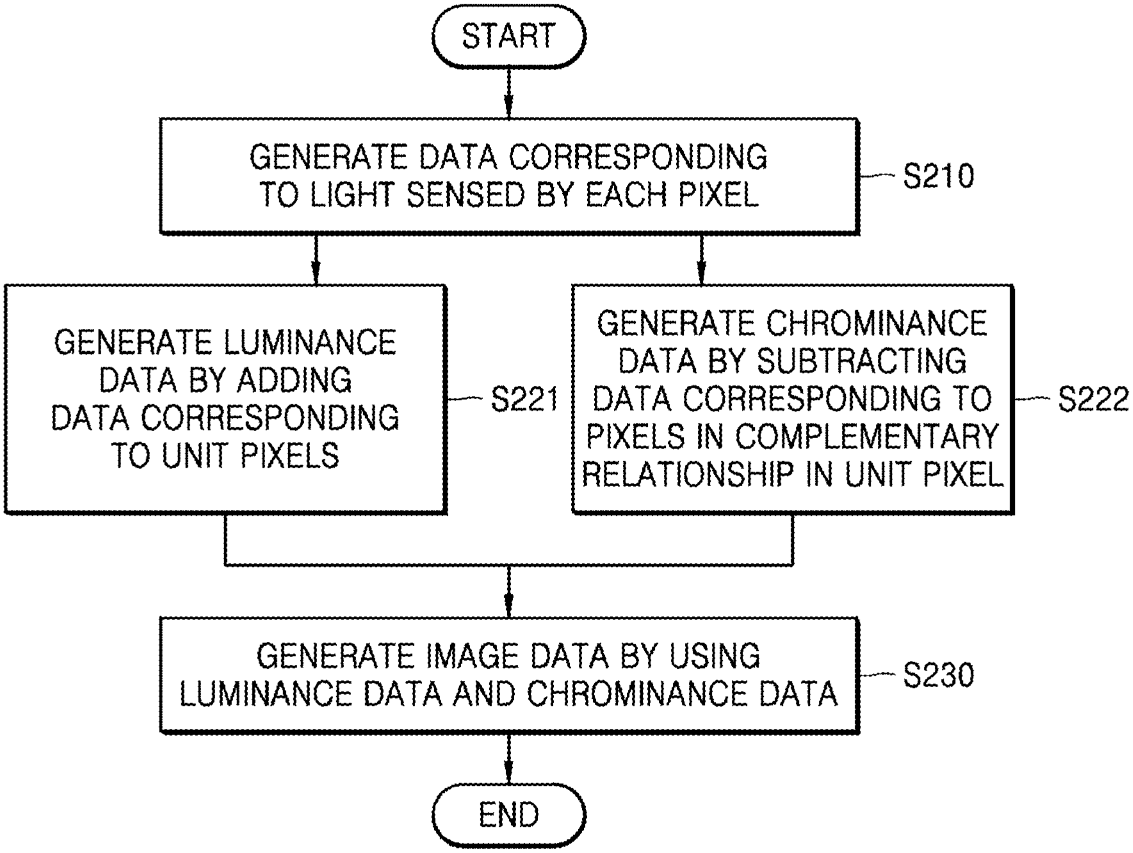
FIG. 9 is a flowchart illustrating an image generating method according to an embodiment.

FIG. 9 is a flowchart illustrating an image generating method according to an embodiment. For convenience of description, the description below is provided based on the unit pattern 1100*a* of FIG. 8.

Referring to FIG. 9, in operation S210, the method may include obtaining data corresponding to light sensed by each pixel. For example, obtaining the data corresponding to the light sensed by each pixel may include generating the data based on electrical signal corresponding to the light sensed by each pixel. In operation S221, the method may include obtaining luminance data based on the data corresponding to the light sensed by each pixel and in operation S222, the method may include obtaining chrominance data based on the data corresponding to the light sensed by each pixel. For example, the data obtained from the first to fourth pixels in each of the unit pixels $U_1$, $U_2$, $U_3$, and $U_4$ may be added to generate luminance data, and data corresponding to the complementary pixels in each of the unit pixels $U_1$, $U_2$, $U_3$, and $U_4$ may be subtracted to obtain chrominance data. In operation S230, the method may include obtaining image data based on the luminance and chrominance data.

The above luminance data may be obtained through analog-binning of the data obtained from the first to fourth pixels in each of the unit pixels. In an example case in which the color data in the complementary relationship is added, mono data having same RGB values is obtained, and thus, an image signal processor may obtain the luminance data through the analog-binning without having an additional mono filter.

That is, data obtained from the first to fourth pixels $G_{11}$, $G_{12}$, $M_{11}$, and $M_{12}$ of the first unit pixel $U_1$ is added through the analog-binning to obtain the luminance, data obtained from the first to fourth pixels $B_1$, $B_2$, $Y_1$, and $Y_2$ of the second unit pixel $U_2$ is added through the analog-binning to obtain the luminance data, data obtained from the first to fourth pixels $R_1$, $R_2$, $C_1$, and $C_2$ of the third unit pixel $U_3$ is added through the analog-binning to obtain the luminance data, and data obtained from the first to fourth pixels $G_{21}$, $G_{22}$, $M_{21}$, and $M_{22}$ of the fourth unit pixel $U_4$ is added to obtain the luminance data. In addition, a detailed method of generating chrominance data is described below.

Figure 10:
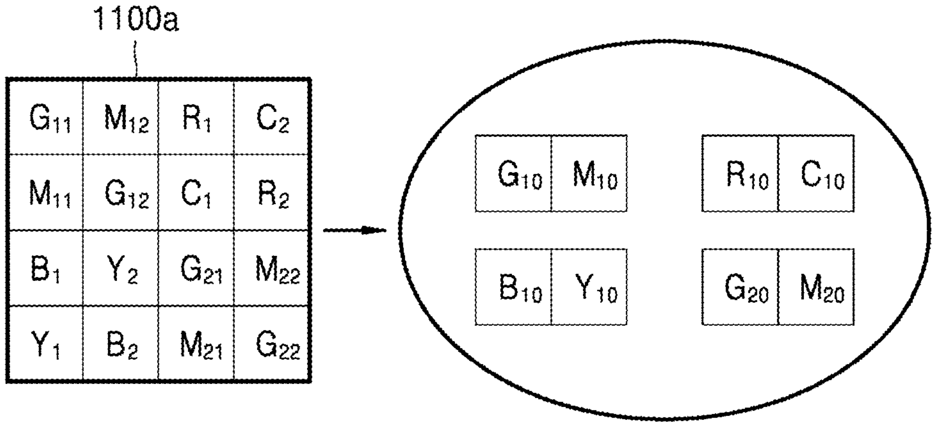
FIG. 10 is a diagram conceptually illustrating a chrominance data obtaining method of FIG. 9.

FIG. 10 is a diagram conceptually illustrating a chrominance data generating method of FIG. 9. For convenience of description, the description below is provided based on the unit pattern 1100*a* of FIG. 2.

Referring to FIG. 10, data corresponding to the first and second pixels $G_{11}$ and $G_{12}$ of the first unit pixel $U_1$ in the unit pattern 1100*a* is added to obtain first green data $G_{10}$, and data corresponding to the third and fourth pixels $M_{11}$ and $M_{12}$ is added to obtain first magenta data $M_{10}$. In the second unit pixel $U_2$, data corresponding to the first and second pixels $B_1$ and $B_2$ is added to obtain blue data $B_{10}$, and data corresponding to third and fourth pixels $Y_1$ and $Y_2$ is added to obtain yellow data $Y_{10}$. In the third unit pixel $U_3$, data corresponding to the first and second pixels $R_1$ and $R_2$ is added to obtain red data $R_{10}$, and data corresponding to the third and fourth pixels $C_1$ and $C_2$ is added to obtain cyan data $C_{10}$. In the fourth unit pixel $U_4$, data corresponding to the first and second pixels $G_{21}$ and $G_{22}$ is added to obtain second green data $G_{20}$, and data corresponding to the third and fourth pixels $M_{21}$ and $M_{22}$ is added to obtain second magenta data $M_{20}$.

The first green data $G_{10}$ and the second green data $G_{20}$ are averaged to obtain third green data ($\overline{G}$), and the first magenta data $M_{10}$ and the second magenta data $M_{20}$ are averaged to obtain third magenta data ($\overline{M}$).

According to an embodiment, primary chrominance signals $C_r$ and $C_b$ and complementary chrominance signals $C_r^c$ and $C_b^c$ may be obtained as in Equation 1 below. Red (R) data and third green data ($\overline{G}$) are subtracted to obtain $C_r$, and blue (B) data and the third green data ($\overline{G}$) are subtracted to obtain $C_b$ to obtain the primary chrominance signals ((1) of Equation 1 below). Also, the third magenta data ($\overline{M}$) and cyan (C) data are subtracted to obtain $C_r^c$, and the yellow (Y) data and the third magenta data ($\overline{M}$) are subtracted to obtain $C_b^c$ to obtain the complementary chrominance signals ((2) of Equation 1 below).

[Equation 1]

$$Cr \approx R - \overline{G},\ Cb \approx B - \overline{G} \quad (1)$$

$$Cr^c \approx \overline{M} - C,\ Cb^c \approx \overline{M} - Y \quad (2)$$

According to an embodiment, as shown in Equation 2 below, the complementary chrominance signals $C_r^c$ and $C_b^c$ are respectively multiplied by weighted values $a^{Cr}$ and $a^{Cb}$ and added to the primary chrominance signals $C_r$ and $C_b$ to obtain weighted chrominance signals ($\widehat{Cr}$ (1) of Equation 2 below) and ($\widehat{Cb}$ (2) of Equation 2 below).

[Equation 2]

$$\widehat{Cr} \approx Cr + \alpha^{Cr} \times Cr^c \quad (1)$$

$$\widehat{Cb} \approx Cb + \alpha^{Cb} \times Cb^c \quad (2)$$

As described above, after obtaining the chrominance signals (or weighted chrominance signals) and luminance data, the chrominance signals and the luminance data are added to generate image data.

In the image sensor, the auto-focusing method, and the image obtaining method described above, an example in which the unit pixel has a 2×2 arrangement is described, but the above descriptions may be also applied to an example in which the unit pixel has a 3×3 arrangement or 4×4 arrangement.

Figure 11A:
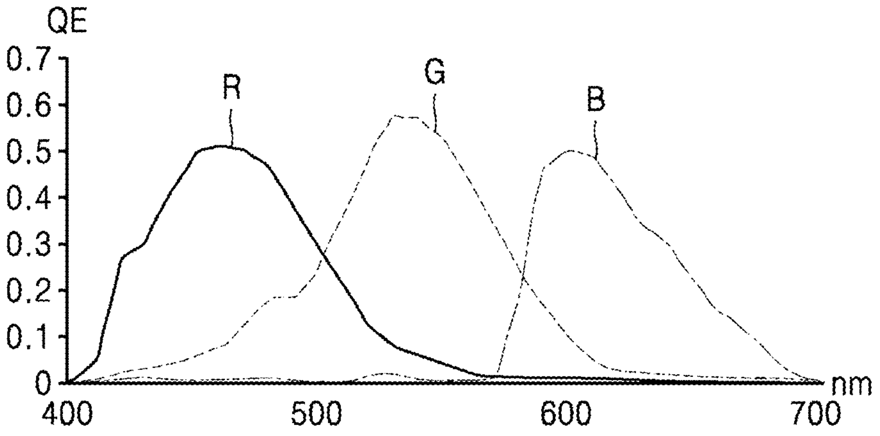
FIGS. 11A and 11B are graphs showing a wavelength range of image data according to an embodiment.
Figure 11B:
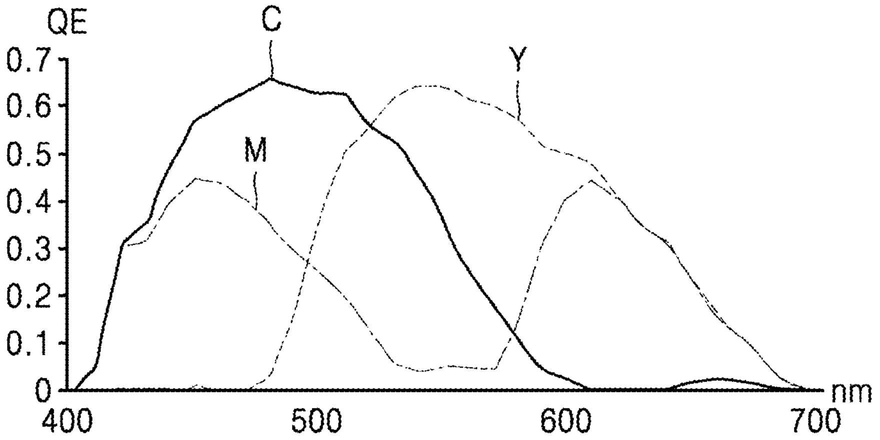

FIGS. 11A and 11B are graphs showing a wavelength range of image data according to an embodiment. FIG. 11A shows a quantum efficiency (QE) according to a wavelength range (nm) of RGB data, and FIG. 11B shows a QE according to the wavelength range (nm) of CMY data.

As described above, because a wavelength range of each component in the CMY data is wider than that of each component in the RGB data, a sensitivity of the CMY data may be about two times higher than that of the RGB data. In consideration of the difference in the sensitivity, the area of the primary pixel (R, G, B) in the unit pixel may be greater than that of the complementary pixel (C, M, Y).

The image sensor according to the embodiment obtains the luminance through analog-binning of the data obtained from each of the pixels in the unit pixel having the complementary pattern structure of diagonal arrangement, may improve a signal-to-noise ratio (SNR) of the image obtained by the image sensor while maintaining a demosaic-free characteristic by obtaining the chrominance by subtracting data obtained from the primary pixels and the complementary pixels in the unit pixel, and may easily detect radiofrequency. Also, even in an example case in which an occlusion region occurs in a certain pixel and the data corresponding to the region is not obtained, the occlusion region may be corrected by using data obtained from another pixel sensing the light of the same color as that of the corresponding pixel in the unit pixel including the corresponding pixel.

According to the image sensor and the auto-focusing method performed in the image sensor according to the embodiment, horizontal sum data of the data obtained from the unit pixel having the complementary pattern structure of diagonal arrangement is obtained, and the horizontal sum data is compared to obtain the vertical phase difference signal. In addition, the horizontal sum data of the data obtained in the unit pixel is obtained, the horizontal sum data is compared to obtain the vertical phase difference signal, and a depth map having increased resolution may be obtained therefrom.

The image sensor may be employed in various high-performance optical devices or high-performance electronic devices. The electronic devices may include, for example, smartphones, mobile phones, cell phones, personal digital assistants (PDAs), laptop computers, personal computers (PCs), a variety of portable devices, electronic apparatuses, surveillance cameras, medical camera, automobiles, Internet of Things (IoT) devices, augmented reality (AR) devices, virtual reality (VR) devices, various kinds of extended reality devices extending experiences of users, other mobile or non-mobile computing devices and are not limited thereto.

The electronic devices may further include, in addition to the image sensor 1000, a processor for controlling the image sensor, for example, an application processor (AP), and may control a plurality of hardware or software elements and may perform various data processes and operations by driving an operation system or application programs via the processor. The processor may further include a graphic processing unit (GPU) and/or an image signal processor. In an example case in which an image signal processor is included in the processor, an image (or video) obtained by the image sensor may be stored and/or output by using the processor.

Figure 12:
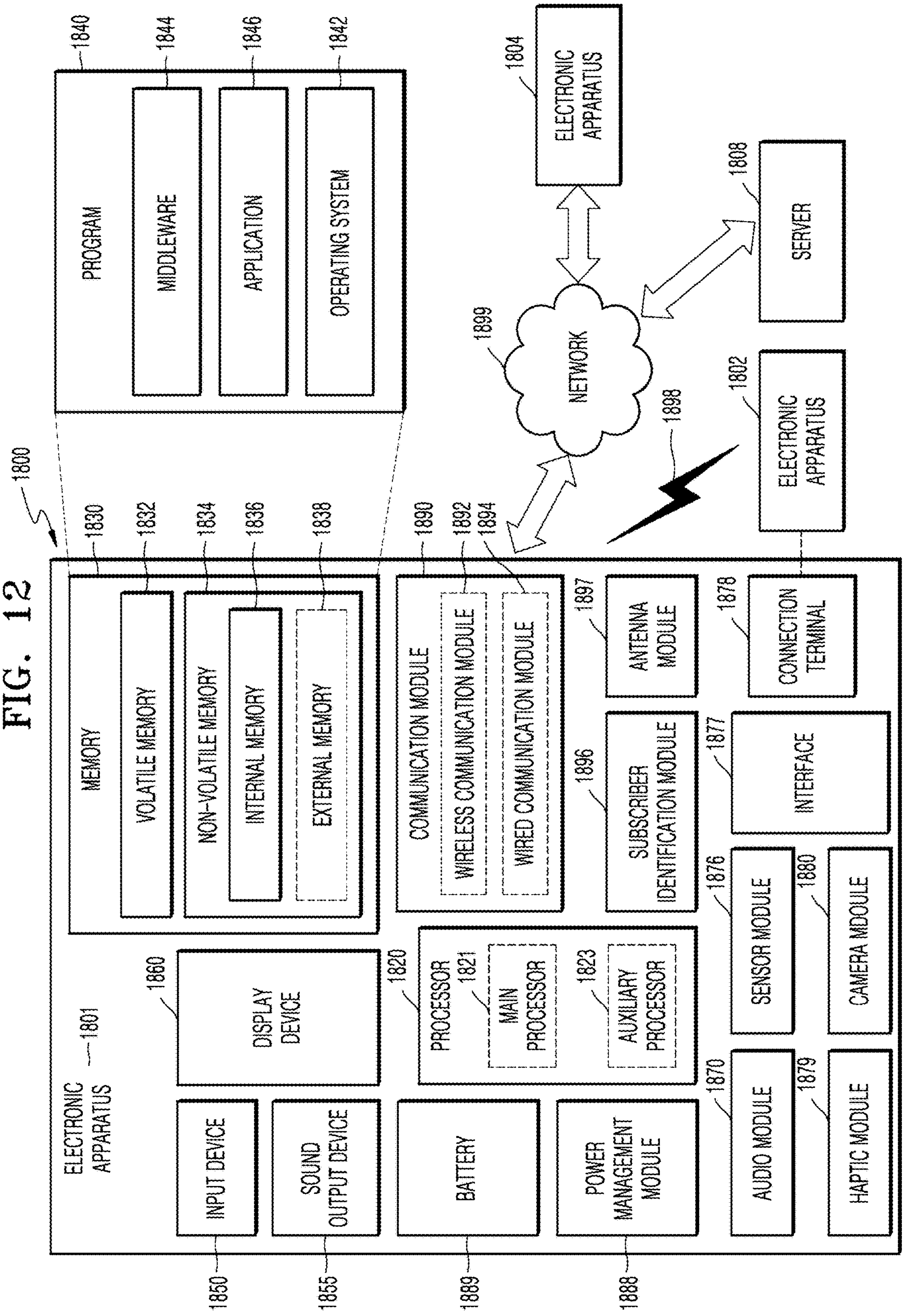
FIG. 12 is a block diagram of an electronic device including an image sensor according to an embodiment.

FIG. 12 is a block diagram of an electronic device including an image sensor according to an embodiment.

Referring to FIG. 12, in a network environment 1800, the electronic apparatus 1801 may communicate with another electronic apparatus 1802 via a first network 1898 (short-range wireless communication network, etc.), or may communicate with another electronic apparatus 1804 and/or a server 1808 via a second network 1899 (long-range wireless communication network, etc.) The electronic apparatus 1801 may communicate with the electronic apparatus 1804 via the server 1808. The electronic apparatus 1801 may include a processor 1820, a memory 1830, an input device 1850, a sound output device 1855, a display device 1860, an audio module 1870, a sensor module 1876, an interface 1877, a haptic module 1879, a camera module 1880, a power management module 1888, a battery 1889, a communication module 1890, a subscriber identification module 1896, and/or an antenna module 1897. In the electronic apparatus 1801, some (display device 1860, etc.) of the elements may be omitted or another element may be added. Some of the elements may be configured as one integrated circuit. For example, the sensor module 1876 (a fingerprint sensor, an iris sensor, an illuminance sensor, etc.) may be embedded and implemented in the display device 1860 (display, etc.)

The processor 1820 may control one or more elements (hardware, software elements, etc.) of the electronic apparatus 1801 connected to the processor 1820 by executing software (program 1840, etc.), and may perform various data processes or operations. As a part of the data processing or operations, the processor 1820 may load a command and/or data received from another element (sensor module 1876, communication module 1890, etc.) to a volatile memory 1832, may process the command and/or data stored in the volatile memory 1832, and may store result data in a non-volatile memory 1834. The processor 1820 may include a main processor 1821 (central processing unit, application processor, etc.) and an auxiliary processor 1823 (graphic processing unit, image signal processor, sensor hub processor, communication processor, etc.) that may be operated independently from or along with the main processor 1821.

The auxiliary processor 1823 may use less power than that of the main processor 1821, and may perform specified functions. The auxiliary processor 1823, on behalf of the main processor 1821 while the main processor 1821 is in an inactive state (sleep state) or along with the main processor 1821 while the main processor 1821 is in an active state (application executed state), may control functions and/or states related to some (display device 1860, sensor module 1876, communication module 1890, etc.) of the elements in the electronic apparatus 1801. The auxiliary processor 1823 (image signal processor, communication processor, etc.) may be implemented as a part of another element (camera module 1880, communication module 1890, etc.) that is functionally related thereto.

The memory 1830 may store various data required by the elements (processor 1820, sensor module 1876, etc.) of the electronic apparatus 1801. The data may include, for example, input data and/or output data about software (program 1840, etc.) and commands related thereto. The memory 1830 may include the volatile memory 1832 and/or the non-volatile memory 1834.

The program 1840 may be stored as software in the memory 1830, and may include an operating system 1842, middleware 1844, and/or an application 1846.

The input device 1850 may receive commands and/or data to be used in the elements (processor 1820, etc.) of the electronic apparatus 1801, from outside (user, etc.) of the electronic apparatus 1801. The input device 1850 may include a microphone, a mouse, a keyboard, and/or a digital pen (stylus pen).

The sound output device 1855 may output a sound signal to outside of the electronic apparatus 1801. The sound output device 1855 may include a speaker and/or a receiver. The speaker may be used fora general purpose such as multimedia reproduction or record play, and the receiver may be used to receive a call. The receiver may be coupled as a part of the speaker or may be implemented as an independent device.

The display device 1860 may provide visual information to outside of the electronic apparatus 1801. The display device 1860 may include a display, a hologram device, or a projector, and a control circuit for controlling the corresponding device. The display device 1860 may include a touch circuitry set to sense a touch, and/or a sensor circuit (pressure sensor, etc.) that is set to measure a strength of a force generated by the touch.

The audio module 1870 may convert sound into an electrical signal or vice versa. The audio module 1870 may acquire sound through the input device 1850, or may output sound via the sound output device 1855 and/or a speaker and/or a headphone of another electronic apparatus (electronic apparatus 1802, etc.) connected directly or wirelessly to the electronic apparatus 1801.

The sensor module 1876 may sense an operating state (power, temperature, etc.) of the electronic apparatus 1801, or an outer environmental state (user state, etc.), and may generate an electrical signal and/or data value corresponding to the sensed state. The sensor module 1876 may include a gesture sensor, a gyro-sensor, a pressure sensor, a magnetic sensor, an acceleration sensor, a grip sensor, a proximity sensor, a color sensor, an infrared (IR) ray sensor, a vivo sensor, a temperature sensor, a humidity sensor, and/or an illuminance sensor.

The interface 1877 may support one or more designated protocols that may be used in order for the electronic apparatus 1801 to be directly or wirelessly connected to another electronic apparatus (electronic apparatus 1802, etc.) The interface 1877 may include a high-definition multimedia interface (HDMI), a universal serial bus (USB) interface, an SD card interface, and/or an audio interface.

The connection terminal 1878 may include a connector by which the electronic apparatus 1801 may be physically connected to another electronic apparatus (electronic apparatus 1802, etc.). The connection terminal 1878 may include an HDMI connector, a USB connector, an SD card connector, and/or an audio connector (headphones connector, etc.).

The haptic module 1879 may convert the electrical signal into a mechanical stimulation (vibration, motion, etc.) or an electrical stimulation that the user may sense through a tactile or motion sensation. The haptic module 1879 may include a motor, a piezoelectric device, and/or an electric stimulus device.

The camera module 1880 may capture a still image and a video. The camera module 1880 may include a lens assembly including one or more lenses, the image sensor 1000 of FIG. 1, image signal processors, and/or flashes. The lens assembly included in the camera module 1880 may collect light emitted from an object that is to be captured.

The power management module 1888 may manage the power supplied to the electronic apparatus 1801. The power management module 1888 may be implemented as a part of a power management integrated circuit (PMIC).

The battery 1889 may supply electric power to components of the electronic apparatus 1801. The battery 1889 may include a primary battery that is not rechargeable, a secondary battery that is rechargeable, and/or a fuel cell.

The communication module 1890 may support the establishment of a direct (wired) communication channel and/or a wireless communication channel between the electronic apparatus 1801 and another electronic apparatus (electronic apparatus 1802, electronic apparatus 1804, server 1808, etc.), and execution of communication through the established communication channel. The communication module 1890 may be operated independently from the processor 1820 (application processor, etc.), and may include one or more communication processors that support the direct communication and/or the wireless communication. The communication module 1890 may include a wireless communication module 1892 (cellular communication module, a short-range wireless communication module, a global navigation satellite system (GNSS) communication module) and/or a wired communication module 1894 (local area network (LAN) communication module, a power line communication module, etc.). From among the communication modules, a corresponding communication module may communicate with another electronic apparatus via a first network 1898 (short-range communication network such as Bluetooth, WiFi direct, or infrared data association (IrDA)) or a second network 1899 (long-range communication network such as a cellular network, Internet, or computer network (LAN, WAN, etc.)). Such above various kinds of communication modules may be integrated as one element (single chip, etc.) or may be implemented as a plurality of elements (a plurality of chips) separately from one another. The wireless communication module 1892 may identify and authenticate the electronic apparatus 1801 in a communication network such as the first network 1898 and/or the second network 1899 by using subscriber information (international mobile subscriber identifier (IMSI), etc.) stored in the subscriber identification module 1896.

The antenna module 1897 may transmit or receive the signal and/or power to/from outside (another electronic apparatus, etc.). An antenna may include a radiator formed as a conductive pattern formed on a substrate (PCB, etc.). The antenna module 1897 may include one or more antennas. In an example case in which the antenna module 1897 includes a plurality of antennas, from among the plurality of antennas, an antenna that is suitable for the communication type used in the communication network such as the first network 1898 and/or the second network 1899 may be selected by the communication module 1890. The signal and/or the power may be transmitted between the communication module 1890 and another electronic apparatus via the selected antenna. Another component (RFIC, etc.) other than the antenna may be included as a part of the antenna module 1897.

Some of the elements may be connected to one another via the communication method among the peripheral devices (bus, general purpose input and output (GPIO), serial peripheral interface (SPI), mobile industry processor interface (MIPI), etc.) and may exchange signals (commands, data, etc.).

The command or data may be transmitted or received between the electronic apparatus 1801 and the external electronic apparatus 1804 via the server 1808 connected to the second network 1899. Other electronic apparatuses 1802 and 1804 may be the devices that are the same as or different kinds from the electronic apparatus 1801. All or some of the operations executed in the electronic apparatus 1801 may be executed in one or more devices among the other electronic apparatuses 1802, 1804, and 1808. In an example case in which the electronic apparatus 1801 has to perform a certain function or service, the electronic apparatus 1801 may request one or more other electronic apparatuses to perform some or entire function or service, instead of executing the function or service by itself. One or more electronic apparatuses receiving the request execute an additional function or service related to the request and may transfer a result of the execution to the electronic apparatus 1801. To do this, for example, a cloud computing, a distributed computing, or a client-server computing technique may be used.

Figure 13:
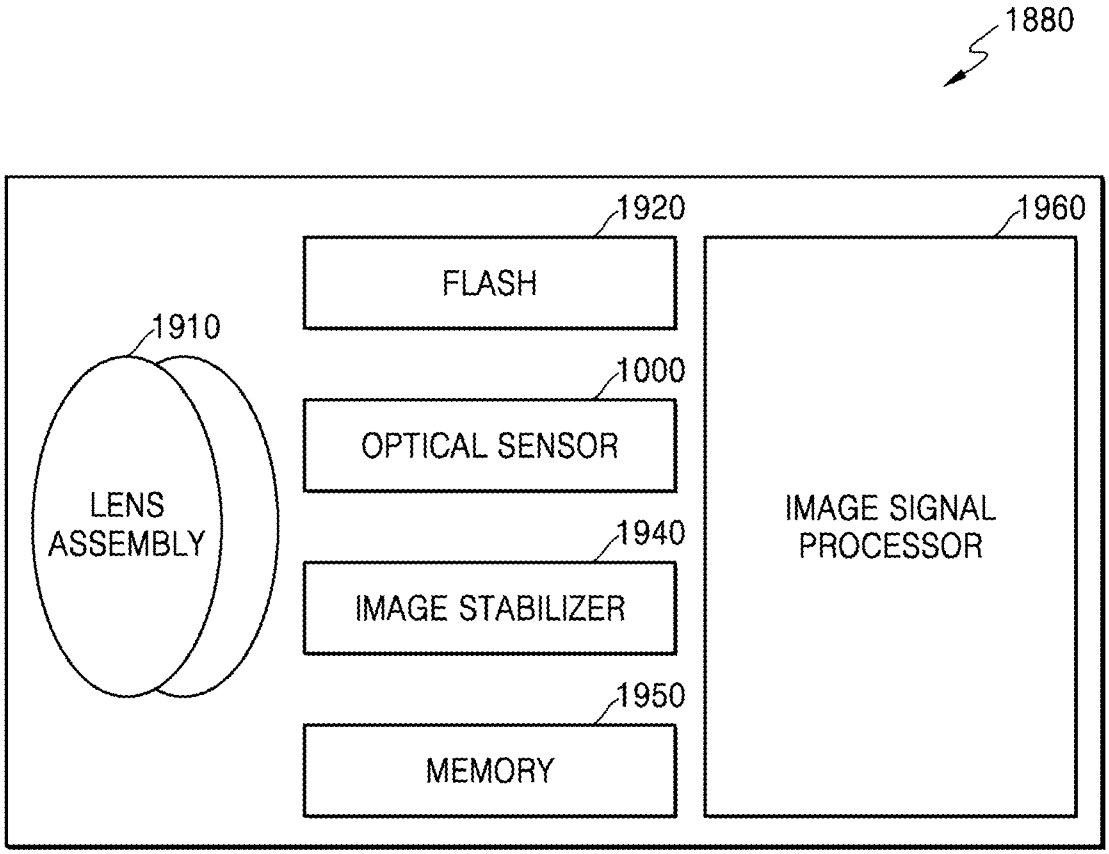
FIG. 13 is a block diagram of a camera module in FIG. 12.

FIG. 13 is a block diagram showing an example of the camera module 1880 of FIG. 12.

Referring to FIG. 13, the camera module 1880 may include a lens assembly 1910, a flash 1920, an image sensor 1000 (refer to FIG. 1), an image stabilizer 1940, a memory 1950 (buffer memory, etc.), and/or an image signal processor 1960. The lens assembly 1910 may collect light emitted from an object that is to be captured. The camera module 1880 may include a plurality of lens assemblies 1910, and in this case, the camera module 1880 may include a dual camera module, a 360-degree camera, or a spherical camera. Some of the plurality of lens assemblies 1910 may have the same lens properties (viewing angle, focal distance, autofocus, F number, optical zoom, etc.) or different lens properties. The lens assembly 1910 may include a wide-angle lens or a telephoto lens.

The flash 1920 may emit light that is used to strengthen the light emitted or reflected from the object. The flash 1920 may include one or more light-emitting diodes (red-green-blue (RGB) LED, white LED, infrared LED, ultraviolet LED, etc.), and/or a Xenon lamp. The image sensor 1000 may be the image sensor described above with reference to FIG. 1, and converts the light emitted or reflected from the object and transferred through the lens assembly 1910 into an electrical signal to obtain an image corresponding to the object. The image sensor 1000 may include one or more selected sensors from among image sensors having different properties such as an RGB sensor, a black-and-white (BW) sensor, an IR sensor, and a UV sensor. Each of the sensors included in the image sensor 1000 may be implemented as a charge coupled device (CCD) sensor and/or a complementary metal oxide semiconductor (CMOS) sensor.

The image stabilizer 1940, in response to a motion of the camera module 1880 or the electronic apparatus 1901 including the camera module 1880, moves one or more lenses included in the lens assembly 1910 or the image sensor 1000 in a certain direction or controls the operating characteristics of the image sensor 1000 (adjusting of a read-out timing, etc.) in order to compensate fora negative influence of the motion. According to an embodiment, the image stabilizer 1940 may sense the movement of the camera module 1880 or the electronic apparatus 1801 by using a gyro sensor or an acceleration sensor provided in the camera module 1880 or provided outside of the camera module 1880. The image stabilizer 1940 may be implemented as an optical type.

The memory 1950 may store some or entire data of the image obtained through the image sensor 1000 for next image processing operation. In an example case in which a plurality of images are obtained at a high speed, obtained original data (Bayer-patterned data, high resolution data, etc.) is stored in the memory 1950, and a low resolution image is only displayed. Then, original data of a selected image (user selection, etc.) may be transferred to the image signal processor 1960. The memory 1950 may be integrated with the memory 1830 of the electronic apparatus 1801, or may include an additional memory that is operated independently.

The image signal processor 1960 may perform image treatment on the image obtained through the image sensor 1000 or the image data stored in the memory 1950. The image processing may include a depth map generation, a three-dimensional modeling, a panorama generation, extraction of features, an image combination, and/or an image compensation (noise reduction, resolution adjustment, brightness adjustment, blurring, sharpening, softening, etc.). The image signal processor 1960 may perform controlling (exposure time control, read-out timing control, etc.) of the elements (image sensor 1000, etc.) included in the camera module 1880. The image processed by the image signal processor 1960 may be stored again in the memory 1950 for additional process, or may be provided to an external element of the camera module 1880 (e.g., the memory 1830, the display device 1860, the electronic apparatus 1802, the electronic apparatus 1804, the server 1808, etc.). The image signal processor 1960 may be integrated with the processor 1820, or may be configured as an additional processor that is independently operated from the processor 1820. In an example case in which the image signal processor 1960 is configured as an additional processor separately from the processor 1820, the image processed by the image signal processor 1960 undergoes through an additional image treatment by the processor 1820 and then may be displayed on the display device 1860.

Figure 14:
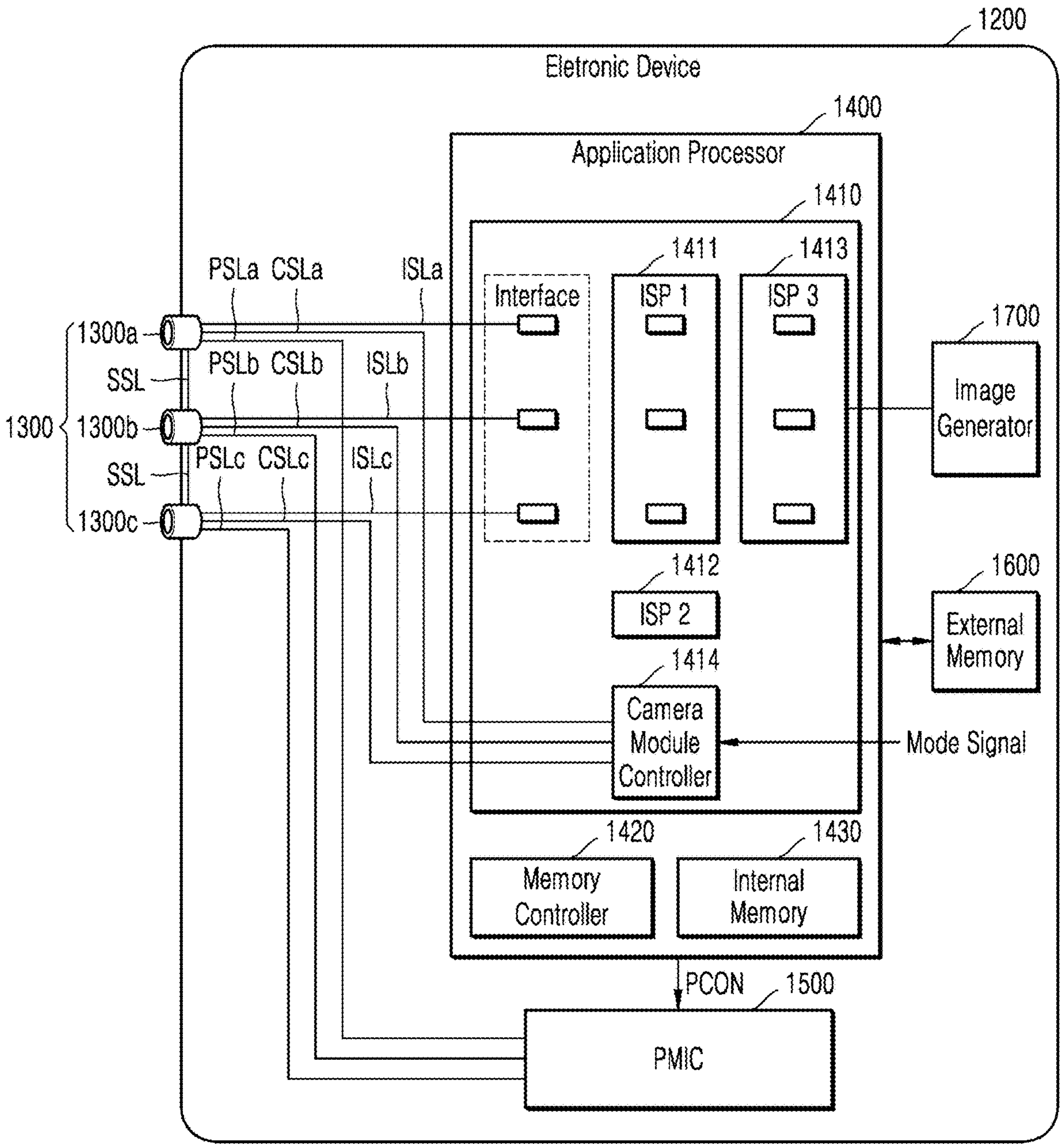
FIG. 14 is a block diagram of an electronic device including a multi-camera module.
Figure 15:
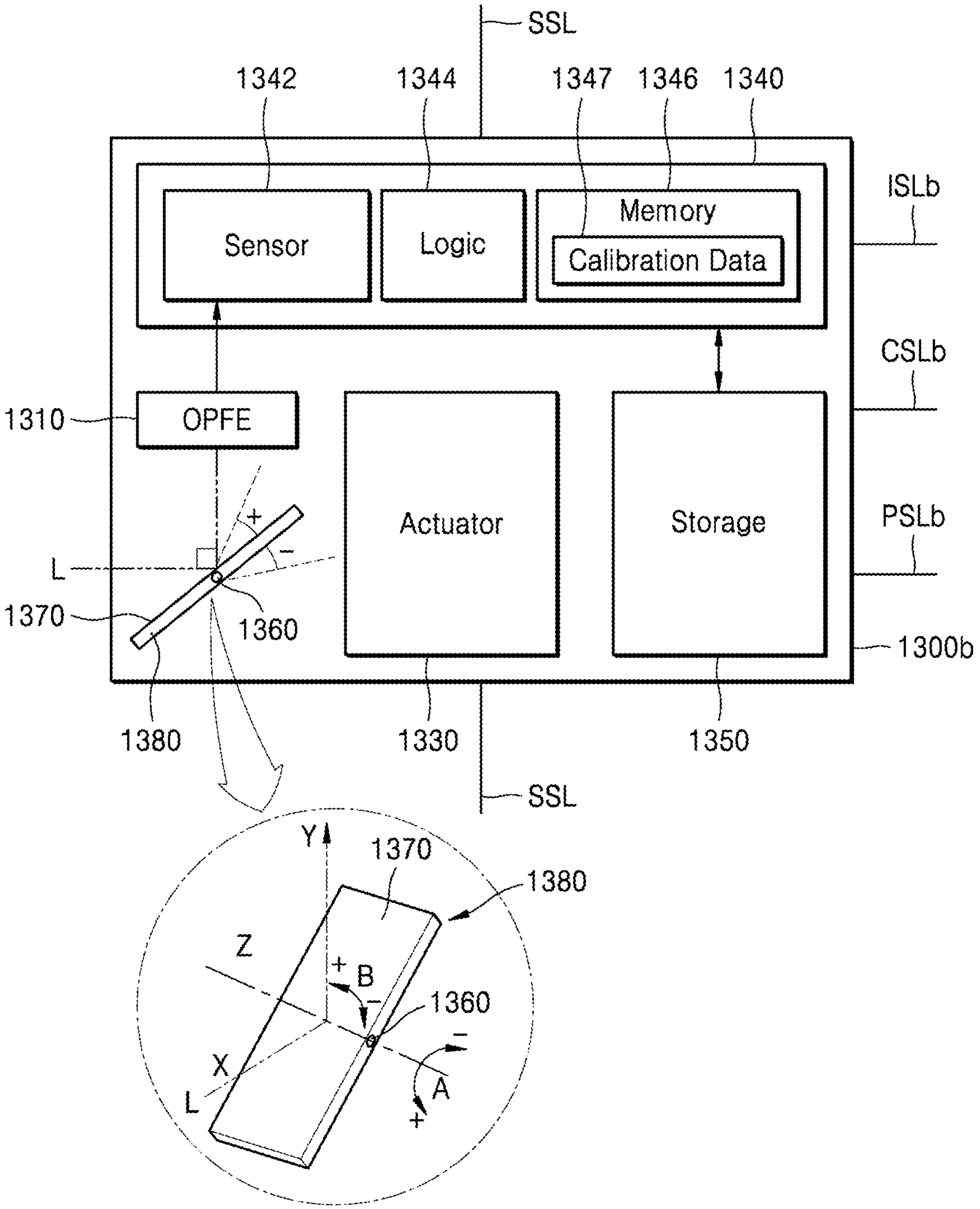
FIG. 15 is a detailed block diagram of the multi-camera module in the electronic device of FIG. 14.

FIG. 14 is a block diagram of an electronic device 1200 including a multi-camera module, and FIG. 15 is a detailed block diagram of the camera module in the electronic device shown in FIG. 14.

Referring to FIG. 14, the electronic device 1200 may include a camera module group 1300, an application processor 1400, a power management integrated circuit (PMIC) 1500, an external memory 1600, and an image generator 1700.

The camera module group 1300 may include a plurality of camera modules 1300*a*, 1300*b*, and 1300*c*. Although the drawings show an example in which three camera modules 1300*a*, 1300*b*, and 1300*c* are arranged, one or more embodiments are not limited thereto. In some embodiments, the camera module group 1300 may be modified to include only two camera modules. Also, in some embodiments, the camera module group 1300 may be modified to include n (n is 4 or greater natural number) camera modules.

Hereinafter, detailed configuration of one camera module 1300*b* is described in detail below with reference to FIG. 15, but the description provided below may be also applied to the other camera modules 1300*a* and 1300*c* according to the embodiments.

Referring to FIG. 15, the camera module 1300*b* may include a prism 1305, an optical path folding element (OPFE) 1310, an actuator 1330, an image sensing device 1340, and a storage 1350.

The prism 1305 may include a reflecting surface 1307 having a light-reflecting material and may deform a path of light L incident from outside.

In some embodiments, the prism 1305 may change the path of the light L incident in the first direction (X-direction) into a second direction (Y-direction) that is perpendicular to the first direction (X-direction). Also, the prism 1305 may rotate the reflecting surface 1307 having the light-reflecting material about a center axis 1106 in a direction A, or about the center axis 1306 in a direction B such that the path of the light L incident in the first direction (X-direction) may be changed to the second direction (Y-direction) perpendicular to the first direction (X-direction). Here, the OPFE 1310 may also move in the third direction (Z-direction) that is perpendicular to the first direction (X-direction) and the second direction (Y-direction).

In some embodiments, as shown in the drawings, the maximum rotation angle of the prism 1305 in the direction A is 15° or less in the positive A direction and is greater than 15° in the negative A direction, but the embodiments are not limited thereto.

In some embodiments, the prism 1305 may be moved by the angle of about 20°, or between 10° to 20° or 15° to 20° in the positive or negative B direction. Here, the moving angle is the same in the positive or negative B direction, or may be similar within a range of about 1°.

In some embodiments, the prism 1305 may move the reflecting surface 1307 of the light-reflective material in the third direction (e.g., Z direction) that is parallel to the direction in which the center axis 1306 extends.

The OPFE 1310 may include, for example, optical lenses formed as m groups (here, m is a natural number). Here, m lenses move in the second direction (Y-direction) and may change an optical zoom ratio of the camera module 1300*b*. In an example case in which a basic optical zoom ratio of the camera module 1300*b* is Z and m optical lenses included in the OPFE 1310 move, the optical zoom ratio of the camera module 1300*b* may be changed to 3Z, 5Z, or 10Z or greater.

The actuator 1330 may move the OPFE 1310 or the optical lens (hereinafter, referred to as optical lens) to a certain position. For example, the actuator 1330 may adjust the position of the optical lens such that the image sensor 1342 may be located at a focal length of the optical lens for exact sensing operation.

An image sensing device 1340 may include the image sensor 1342, a control logic 1344, and a memory 1346. The image sensor 1342 may sense an image of a sensing target by using the light L provided through the optical lens. The control logic 1344 may control the overall operation of the camera module 1300*b*. For example, the control logic 1344 may control the operations of the camera module 1300*b* according to a control signal provided through a control signal line CSLb.

The memory 1346 may store information that is necessary for the operation of the camera module 1300*b*, e.g., calibration data 1347. The calibration data 1347 may include information that is necessary to generate image data by using the light L provided from outside through the camera module 1300*b*. The calibration data 1347 may include, for example, information about the degree of rotation described above, information about the focal length, information about an optical axis, etc. In an example case in which the camera module 1300*b* is implemented in the form of a multi-state camera of which the focal length is changed according to the position of the optical lens, the calibration data 1347 may include information related to focal length values of the optical lens according to each position (or state) and autofocusing.

The storage unit 1350 may store image data sensed through the image sensor 1342. The storage unit 1350 may be provided outside of the image sensing device 1340 and may be stacked with a sensor chip included in the image sensing device 1340. In some embodiments, the storage unit 1350 may be implemented as electrically erasable programmable read-only memory (EEPROM), but one or more embodiments are not limited thereto.

Referring to FIGS. 14 and 15, in some embodiments, each of the plurality of camera modules 1300*a*, 1300*b*, and 1300*c* may include the actuator 1330. Accordingly, each of the plurality of camera modules 1300*a*, 1300*b*, and 1300*c* may include the calibration data 1347 that is the same as or different from the others, according to the operation of the actuator 1330 included therein.

In some embodiments, one (for example, 1300*b*) of the plurality of camera modules 1300*a*, 1300*b*, and 1300*c* may be a camera module in a folded lens type including the prism 1305 and the OPFE 1310 described above, and the other camera modules (for example, 1300*a* and 1300*c*) may be vertical type camera modules not including the prism 1305 and the OPFE 1310. However, the disclosure is not limited thereto.

In some embodiments, one (for example, 1300*c*) of the plurality of camera modules 1300*a*, 1300*b*, and 1300*c* may be a depth camera of a vertical type, which extracts depth information by using infrared ray (IR).

In some embodiments, at least two camera modules (e.g., 1300*a* and 1300*b*) from among the plurality of camera module 1300*a*, 1300*b*, and 1300*c* may have different fields of view. In this case, for example, the optical lenses of the at least two camera modules (e.g., 1300*a* and 1300*b*) from among the plurality of camera modules 1300*a*, 1300*b*, and 1300*c* may be different from each other, but one or more embodiments are not limited thereto.

Also, in some embodiments, the plurality of camera modules 1300*a*, 1300*b*, and 1300*c* may have different fields of view from one another. In this case, the optical lenses respectively included in the plurality of camera modules 1300*a*, 1300*b*, and 1300*c* may be different from one another, but the inventive concept is not limited thereto.

In some embodiments, the plurality of camera modules 1300*a*, 1300*b*, and 1300*c* may be physically isolated from one another. That is, the sensing region of one image sensor 1342 may not be divided and used by the plurality of camera modules 1300*a*, 1300*b*, and 1300*c*, but the plurality of camera modules 1300*a*, 1300*b*, and 1300*c* may each have an independent image sensor 1342 provided therein.

Referring back to FIG. 14, the application processor 1400 may include an image processing device 1410, a memory controller 1420, and an internal memory 1430. The application processor 1400 may be separately implemented from the plurality of camera modules 1300*a*, 1300*b*, and 1300*c*. For example, the application processor 1400 and the plurality of camera modules 1300*a*, 1300*b*, and 1300*c* may be separately implemented as separate semiconductor chips.

The image processing device 1410 may include a plurality of image processors 1411, 1412, and 1413, and a camera module controller 1414.

The image data generated by each of the camera modules 1300*a*, 1300*b*, and 1300*c* may be provided to the image processing device 1410 via separate image signal lines ISLa, ISLb, and ISLc, respectively. The image data transfer may be carried out by using a camera serial interface (CSI) based on a mobile industry processor interface (MIPI), for example, but is not limited thereto.

The image data transferred to the image processing device 1410 may be stored in an external memory 1600 before being transferred to the image processors 1411 and 1412. The image data stored in the external memory 1600 may be provided to the image processor 1411 and/or the image processor 1412. The image processor 1411 may correct the image data in order to generate video. The image processor 1412 may correct the image data in order to generate still images. For example, the image processors 1411 and 1412 may perform a pre-processing operation such as a color calibration, a gamma calibration on the image data.

The image processor 1411 may include sub-processors. In an example case in which the number of sub-processors is equal to the number of camera modules 1300*a*, 1300*b*, and 1300*c*, each of the sub-processors may process the image data provided from one camera module. In an example case in which the number of sub-processors is less than the number of camera modules 1300*a*, 1300*b*, and 1300*c*, at least one of the sub-processors may process the image data provided from a plurality of camera module by using a timing-sharing process. The image data processed by the image processor 1411 and/or the image processor 1412 may be stored in the external memory 1600 before being transferred to the image processor 1413. The image data stored in the external memory 1600 may be transferred to the image processor 1412. The image processor 1412 may perform a post-processing operation such as a noise calibration, a sharpen calibration, etc. on the image data.

The image data processed in the image processor 1413 may be provided to the image generator 1700. The image generator 1700 may generate a final image by using the image data provided from the image processor 1413 according to image generating information or a mode signal.

In detail, the image generator 1700 may generate an output image by merging at least parts of the image data generated by the camera modules 1300*a*, 1300*b*, and 1300*c* having different fields of view, according to image generating information or the mode signal. Also, the image generator 1700 may generate the output image by selecting one of pieces of image data generated by the camera modules 1300*a*, 1300*b*, and 1300*c* having different fields of view, according to image generating information or the mode signal.

In some embodiments, the image generating information may include a zoom signal or a zoom factor. Also, in some embodiments, the mode signal may be, for example, a signal based on a mode selected by a user.

In an example case in which the image generating information is a zoom signal (zoom factor) and the camera modules 1300*a*, 1300*b*, and 1300*c* have different fields of view (angles of view) from one another, the image generator 1700 may perform different operations according to the kind of zoom signal. In an example case in which the zoom signal is a first signal, the image data output from the camera module 1300*a* is merged with the image data output from the camera module 1300*c*, and then, the output image may be generated by using the merged image signal and the image data output from the camera module 1300*b* and not used in the merge. In an example case in which the zoom signal is a second signal that is different from the first signal, the image generator 1700 may not perform the image data merging, and then, may generate the output image by selecting one piece of the image data output respectively from the camera modules 1300*a*, 1300*b*, and 1300*c*. However, one or more embodiments are not limited thereto, and the method of processing the image data may be modified as necessary.

The camera module controller 1414 may provide each of the camera modules 1300*a*, 1300*b*, and 1300*c* with a control signal. The control signals generated by the camera module controller 1414 may be provided to corresponding camera modules 1300*a*, 1300*b*, and 1300*c* via control signal lines CSLa, CSLb, and CSLc separated from one another.

In some embodiments, the control signal provided to the plurality of camera modules 1300*a*, 1300*b*, and 1300*c* from the camera module controller 1414 may include mode information according to the mode signal. The plurality of camera modules 1300*a*, 1300*b*, and 1300*c* may operate in a first operation mode and a second operation mode in relation to the sensing speed, based on the mode information.

In the first operation mode, the plurality of camera modules 1300*a*, 1300*b*, and 1300*c* may generate the image signal at a first speed (for example, generating an image signal of a first frame rate), encodes the image signal at a second speed that is faster than the first speed (for example, encoding the image signal of a second frame rate that is greater than the first frame rate), and transfers the encoded image signal to the application processor 1400. Here, the second speed may be 30 times faster than the first speed or less.

The application processor 1400 may store the received image signal, that is, the encoded mage signal, in the internal memory 1430 provided therein or the external memory 1600 outside the application processor 1400, and after that, reads and decodes the encoded signal from the internal memory 1430 or the external memory 1600, and may display the image data generated based on the decoded image signal. For example, the image processors 1411 and 1412 in the image processing device 1410 may perform decoding, and may perform image processing on the decoded image signals.

In the second operation mode, the plurality of camera modules 1300*a*, 1300*b*, and 1300*c* generates an image signal at a third speed that is slower than the first speed (for example, generating the image signal of a third frame rate that is lower than the first frame rate), and may transfer the image signal to the application processor 1400. The image signal provided to the application processor 1400 may be a signal that is not encoded. The application processor 1400 may perform the image processing of the received image signal or store the image signal in the internal memory 1430 or the external memory 1600.

The PMIC 1500 may supply the power, for example, the power voltage, to each of the plurality of camera modules 1300*a*, 1300*b*, and 1300*c*. For example, the PMIC 1500 may supply the first power to the camera module 1300*a* via a power signal line PSLa, the second power to the camera module 1300*b* via a power signal line PSLb, and the third power to the camera module 1300*c* via a power signal line P S Lc, under the control of the application processor 1400.

The PMIC 1500 may generate the power corresponding to each of the plurality of camera modules 1300*a*, 1300*b*, and 1300*c* and may adjust the power level, in response to a power control signal PCON from the application processor 1400. The power control signal PCON may include a power adjusting signal for each operation mode of the plurality of camera modules 1300*a*, 1300*b*, and 1300*c*. For example, the operation mode may include a low power mode, and the power control signal PCON may include information about the camera module operating in the low-power mode and set power level. The levels of the power provided to the plurality of camera modules 1300*a*, 1300*b*, and 1300*c* may be equal to or different from each other. Also, the power level may be dynamically changed.

The image sensor and the electronic device including the image sensor obtain luminance data through the analog-binning of data obtained from the unit pixel having the complementary pattern structure of diagonal arrangement and obtain the chrominance data by subtracting the data obtained from the unit pixel, and thus, a signal-to-noise ratio (SNR) may be improved, and a demosaic-free characteristic may be maintained.

Also, the auto-focusing method obtains the vertical sum and horizontal sum data by using the data obtained from the unit pixel having the complementary pattern structure of diagonal arrangement, and then, may obtain the horizontal phase difference signal and vertical phase difference signal by using the above data.

While the image sensor and the electronic device including the image sensor, and the auto-focusing method have been particularly shown and described with reference to exemplary embodiments thereof, it will be understood by those of ordinary skill in the art that various changes in form and details may be made therein without departing from the spirit and scope as defined by the following claims. The preferred embodiments should be considered in descriptive sense only and not for purposes of limitation. Therefore, the scope of the disclosure is defined not by the detailed description of the disclosure but by the appended claims, and all differences within the scope will be construed as being included in the disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An image sensor comprising:

a sensor substrate having a plurality of unit patterns, each of the plurality of unit patterns comprising a plurality of unit pixels, and the plurality of unit pixels comprising a first unit pixel, a second unit pixel, a third unit pixel, and a fourth unit pixel;

a color separating lens array provided on the sensor substrate, the color separating lens array comprising a plurality of nanoposts that are configured to separate incident light according to wavelengths corresponding to each of the plurality of unit pixels and condense the incident light onto corresponding pixels in the plurality of unit pixels; and an optical diffuser provided on the color separating lens array, wherein each of the first to fourth unit pixels comprises four or more pixels that have a complementary pattern structure of a diagonal arrangement.

2. The image sensor of claim 1, wherein each of the first to fourth unit pixels comprises a first pixel, a second pixel, a third pixel and a fourth pixel, the first to fourth pixels are provided in a 2×2 arrangement in each of the plurality of unit pixels, and the first pixel is provided at a first row and a first column in each of the plurality of unit pixels, the second pixel is provided at a second row and a second column in each of the plurality of unit pixels, the third pixel is provided at the second row and the first column in each of the plurality of unit pixels, and the fourth pixel is provided at the first row and the second column in each of the plurality of unit pixels.

3. The image sensor of claim 2, wherein the first pixel and the second pixel provided in each of the first to fourth unit pixels are configured to sense light of primary colors, and the third pixel and the fourth pixel are configured to sense light of complementary colors with respect to the light of the primary colors sensed by the first pixel and the second pixel.

4. The image sensor of claim 3, wherein the first pixel and the second pixel have areas greater than areas of the third pixel and the fourth pixel.

5. The image sensor of claim 1, wherein the first to fourth unit pixels are provided in a 2×2 arrangement in a first unit pattern, among the plurality of unit patterns, and the first unit pixel is provided at a first row and a first column of the first unit pattern, the second unit pixel is provided at a second row and the first column of the first unit pattern, the third unit pixel is provided at the first row and the second column of the first unit pattern, and the fourth unit pixel is provided at the second row and the second column of the first unit pattern.

6. The image sensor of claim 5, wherein each of the first to fourth unit pixels comprises a first pixel, a second pixel, a third pixel and a fourth pixel, and the first pixel and the second pixel in the first unit pixel and the fourth unit pixel are configured to sense green light, the third pixel and the fourth pixel in the first unit pixel and the fourth unit pixel are configured to sense magenta light, the first pixel and the second pixel of the second unit pixel are configured to sense blue light, the third pixel and the fourth pixel of the second unit pixel are configured to sense yellow light, the first pixel and the second pixel of the third unit pixel are configured to sense red light, and the third pixel and the fourth pixel of the third unit pixel are configured to sense cyan light.

7. An electronic device comprising:

a lens assembly comprising one or more lenses, the lens assembly configured to form an optical image of an object;

an image sensor configured to convert the optical image formed by the lens assembly into an electrical signal; and a processor configured to process the signal generated by the image sensor, wherein the image sensor comprises:

a sensor substrate having a plurality of unit patterns, each of the plurality of unit patterns comprising a plurality of unit pixels, and the plurality of unit pixels comprising a first unit pixel, a second unit pixel, a third unit pixel, and a fourth unit pixel;

a color separating lens array provided on the sensor substrate, the color separating lens array comprising a plurality of nanoposts that are configured to separate incident light according to wavelengths corresponding to each of the plurality of unit pixels and condense the incident light onto corresponding pixels in the plurality of unit pixels; and an optical diffuser provided on the color separating lens array, wherein each of the first to fourth unit pixels comprises four or more pixels that have a complementary pattern structure of a diagonal arrangement.

8. The electronic device of claim 7, wherein each of the first to fourth unit pixels comprises a first pixel, a second pixel, a third pixel and a fourth pixel, the first to fourth pixels are provided in a 2×2 arrangement in each of the plurality of unit pixels, and the first pixel is provided at a first row and a first column in each of the plurality of unit pixels, the second pixel is provided at a second row and a second column in each of the plurality of unit pixels, the third pixel is provided at the second row and the first column in each of the plurality of unit pixels, and the fourth pixel is provided at the first row and the second column in each of the plurality of unit pixels.

9. The electronic device of claim 8, wherein the first pixel and the second pixel provided in each of the first to fourth unit pixels are configured to sense light of primary colors, and the third pixel and the fourth pixel are configured to sense light of complementary colors with respect to a primary color light sensed by the first pixel and the second pixel.

10. The electronic device of claim 9, wherein the first pixel and the second pixel have areas greater than areas of the third pixel and the fourth pixel.

11. The electronic device of claim 7, wherein the first to fourth unit pixels are provided in a 2×2 arrangement in a first unit pattern, among the plurality of unit patterns, and the first unit pixel is provided at a first row and a first column of the first unit pattern, the second unit pixel is provided at a second row and the first column of the first unit pattern, the third unit pixel is provided at the first row and the second column of the first unit pattern, and the fourth unit pixel is provided at the second row and the second column of the first unit pattern.

12. The electronic device of claim 11, wherein each of the first to fourth unit pixels comprises a first pixel, a second pixel, a third pixel and a fourth pixel, and the first pixel and the second pixel in the first unit pixel and the fourth unit pixel are configured to sense green light, the third pixel and the fourth pixel in the first unit pixel and the fourth unit pixel are configured to sense magenta light, the first pixel and the second pixel of the second unit pixel are configured to sense blue light, the third pixel and the fourth pixel of the second unit pixel are configured to sense yellow light, the first pixel and the second pixel of the third unit pixel are configured to sense red light, and the third pixel and the fourth pixel of the third unit pixel are configured to sense cyan light.

13. An auto-focusing method performed by an image sensor, the auto-focusing method comprising:

selecting an auto-focusing position;

obtaining data of selected region from four or more pixels provided in each of a first unit pixel, a second unit pixel, a third unit pixel and a fourth unit pixel in a unit pattern;

obtaining a vertical sum or a horizontal sum of data corresponding to the four or more pixels provided in each of the first to fourth unit pixels;

obtaining one of a vertical phase difference signal based on the vertical sum of the data corresponding to the four or more pixels or a horizontal phase difference signal based on the horizontal sum of the data corresponding to the four or more pixels;

obtaining a distance between an object and an image sensor based on the vertical phase difference signal or the horizontal phase difference signal; and adjusting a focusing lens based on the distance between the object and the image sensor, wherein the four or more pixels have a complementary pattern structure of a diagonal arrangement.

14. The auto-focusing method of claim 13, wherein the obtaining the vertical phase difference signal comprises:

obtaining first horizontal sum data based on first data from two or more pixels provided in a first row in each of a plurality of unit pixels;

obtaining second horizontal sum data based on second data from two or more pixels provided in a second row in each of the plurality of unit pixels; and obtaining the vertical phase difference signal based on the first horizontal sum data and the second horizontal sum data.

15. The auto-focusing method of claim 13, wherein the obtaining the horizontal phase difference signal comprises:

obtaining first vertical sum data based on first data from two or more pixels provided in a first column in each of a plurality of unit pixels;

obtaining second vertical sum data based on second data from two or more pixels provided in a second column in each of the plurality of unit pixels; and obtaining the horizontal phase difference signal based on the first vertical sum data and the second vertical sum data.

16. The auto-focusing method of claim 13, further comprising selecting one of the vertical phase difference signal and the horizontal phase difference signal by comparing the vertical phase difference signal or horizontal phase difference signal with information stored in a table.

17. The auto-focusing method of claim 13, wherein each of the first to fourth unit pixels comprises a first pixel, a second pixel, a third pixel and a fourth pixel provided in a 2×2 arrangement, and the first pixel is provided at a first row and a first column in each of a plurality of unit pixels, the second pixel is provided at a second row and a second column in each of the plurality of unit pixels, the third pixel is provided at the second row and the first column in each of the plurality of unit pixels, and the fourth pixel is provided at the first row and the second column in each of the plurality of unit pixels.

18. The auto-focusing method of claim 17, wherein the first pixel and the second pixel provided in each of the first to fourth unit pixels are configured to sense light of primary colors, and the third pixel and the fourth pixel are configured to sense light of complementary colors with respect to a primary color light sensed by the first pixel and the second pixel.

19. The auto-focusing method of claim 17, wherein the first to fourth unit pixels are provided in a 2×2 arrangement in the unit pattern, and the first unit pixel is provided at a first row and a first column of the unit pattern, the second unit pixel is provided at a second row and the first column of the unit pattern, the third unit pixel is provided at the first row and the second column of the unit pattern, and the fourth unit pixel is provided at the second row and the second column of the unit pattern.

20. The auto-focusing method of claim 19, wherein the first pixel and the second pixel in the first unit pixel and the fourth unit pixel are configured to sense green light, the third pixel and the fourth pixel in the first unit pixel and the fourth unit pixel are configured to sense magenta light, the first pixel and the second pixel of the second unit pixel are configured to sense blue light, the third pixel and the fourth pixel of the second unit pixel are configured to sense yellow light, the first pixel and the second pixel of the third unit pixel are configured to sense red light, and the third pixel and the fourth pixel of the third unit pixel are configured to sense cyan light.

* * * * *